United States Patent [19]
Takamatsu et al.

[11] Patent Number: 5,844,591
[45] Date of Patent: Dec. 1, 1998

[54] MULTIBEAM LASER RECORDING APPARATUS

[75] Inventors: Masahiro Takamatsu; Masao Ito, both of Ebina, Japan

[73] Assignee: Fuji Xerox Co., Ltd., Tokyo

[21] Appl. No.: 523,545

[22] Filed: Sep. 5, 1995

[30] Foreign Application Priority Data

Sep. 8, 1994 [JP] Japan ................................... 6-215086

[51] Int. Cl.⁶ ............................... B41J 2/47; B41J 2/435
[52] U.S. Cl. ............................................ 347/235; 347/234
[58] Field of Search .................................. 347/235, 232, 347/243, 244, 239; 359/196; 399/38; 358/481, 296; 355/53

[56] References Cited

U.S. PATENT DOCUMENTS

| | | | |
|---|---|---|---|
| 5,006,705 | 4/1991 | Saito et al. | 347/235 |
| 5,053,619 | 10/1991 | Arimoto | 347/235 |
| 5,105,296 | 4/1992 | Cho et al. | 347/235 |
| 5,140,157 | 8/1992 | Ohshima et al. | 347/235 |
| 5,294,944 | 3/1994 | Takeyama et al. | 347/232 |
| 5,627,670 | 5/1997 | Minoura et al. | 359/212 |

FOREIGN PATENT DOCUMENTS

| | | |
|---|---|---|
| U-57-54914 | 3/1982 | Japan. |
| A-61-245174 | 10/1986 | Japan. |
| U-5-53068 | 7/1988 | Japan. |

OTHER PUBLICATIONS

"Dual Beam Laser Diode Scanning System for Ultrahigh Speed Laser Beam Printers Using a Spot Control Method" (ARIMOTO et al.), *Applied Optics*, vol. 26, No. 13, Jul. 1, 1987, pp. 2554–2557.

*Primary Examiner*—N. Le
*Assistant Examiner*—Thinh Nguyen
*Attorney, Agent, or Firm*—Oliff & Berridge, PLC

[57] ABSTRACT

A multibeam laser recording apparatus is so arranged as to include a scanning line interval detecting mechanism located at a position equivalent to the surface of the image carrier, for detecting scanning line intervals of the plural laser beams scanned on the surface of the image carrier, and a controller for controlling the scanning line intervals of the plural laser beams scanned on the image carrier based upon an output derived from the scanning line interval detecting mechanism in such a manner that the scanning line intervals are kept constant.

18 Claims, 19 Drawing Sheets

MULTIBEAM LASER RECORDING APPARATUS

BACKGROUND OF THE INVENTION

1. Field of the Invention

The present invention relates to a multibeam laser recording apparatus for forming an image by simultaneously scanning on a surface of an image carrier by way of a plurality of beams while using a semiconductor laser array as a light source.

2. Description of the Related Art

Conventionally, in such a laser recording apparatus as a laser beam printer and a digital copying machine, for instance, a single semiconductor laser is employed to scan a laser beam on a photosensitive drum so as to expose image information thereon. Then, an electrostatic latent image corresponding to the image information is formed on the photosensitive drum, and this electrostatic latent image is developed to record the image.

In the above-described laser recording apparatus such as the laser printer, the single semiconductor laser is substituted by a semiconductor laser array constructed by arranging a plurality (n) of semiconductor lasers as the image recording light source, and a plurality (n) of scanning lines are simultaneously exposed on the photosensitive drum by using this semiconductor laser array. Thus, there are various merits in highspeed image recording, printing qualities, and cost matters.

That is, in the case that the semiconductor laser array is employed as the image recording light source, even when the scanning speed of the laser beams and the printing speed are set to be equal to those obtained when the single semiconductor laser is employed, density of the scanning line thereof can be made "n" times higher than that of the single semiconductor laser. Accordingly, the image can be recorded with high resolution. Even when the scanning speed of the laser beams and density of the scanning lines are set to be equal to those of the single semiconductor laser, the printing speed of the semiconductor laser array can be increased "n" times higher than that of the single semiconductor laser. Furthermore, even when the printing speed and the scanning line density of the laser beams are set to be equal to those of the single semiconductor laser, the scanning speed of the laser beams, namely the rotation speed of the polygon mirror for scanning the laser beams along the main scanning direction can be reduced to 1/n. Thus, there are various effects that the mechanism for rotating the polygon mirror can be simplified and the cost can be reduced.

As a consequence, in the above-described laser recording apparatus such as the laser beam printer, various techniques to employ the semiconductor laser array have been developed and are gradually popularized.

In such a laser recording apparatus as the laser beam printer, a plurality of semiconductor laser light sources are provided, a plurality of laser beams are synthesized with each other to simultaneously produce a plurality of scanning lines by employing the same scanning optical system. To effectively scan the laser beams, the semiconductor laser array is employed. As shown in FIG. 17 and FIG. 18, the multibeam scanning optical system for performing a "so-called interlaced scanning operation" has been proposed by the Applicant as disclosed in Japanese Patent Unexamined Publication No. Hei 5-53068.

This multibeam scanning optical system described in Japanese Patent Unexamined Publication No. Hei 5-53068 is arranged as follows. That is, as shown in FIG. 19, in the multibeam scanning optical system with employment of a plurality of laser beams, there are provided with the collimate lens 102 for collimating a plurality of laser beams having the wavelength of "λ" and each spread angle of "θ1" which are derived from a plurality of laser diodes 100 and 101 whose oscillating positions are separated from each other by the distance of "r1" so as to improve image reproducibility, and the first scanning optical system 104 for converging the collimated laser beams onto the mirror surface of the rotary polygon 103. This multibeam scanning optical system is further equipped with the f-θ lens 106 positioned between the rotary polygon 103 and the surface of the photosensitive member 105, and the second scanning optical system 107 for converging the laser beams projected from this f-θ lens 106 onto the position separated therefrom by a preselected interlaced scanning period "i" along the sub-scanning direction Y of the surface of the photosensitive member 105. The aperture 104a is positioned at such a location where a plurality of collimated laser beams are intersected with the optical axis of the first scanning optical system, and the above-explained parameters r1, λ, θ1 and i are defined with satisfaction of the below-mentioned formula:

$$K = (4\alpha/\pi)(i\lambda/r1\ \theta1),$$

where K is a constant, α is a value depending on the diameter of the aperture along the sub-scanning direction.

Then, as described above, in the multibeam laser recording apparatus such that the plural laser diodes are used as the light source, and the surface of the photosensitive drum is simultaneously scanned by a plurality of beams to record the image thereon, the spot sizes of the plural laser beams must be aligned with each other. Moreover, the scanning line intervals of the plural laser beams scanned on the photosensitive drum must be made equal to a predetermined value.

In other words, in the above-described multibeam laser recording apparatus, if the scanning line intervals of the plural laser beams scanned on the photosensitive drum are not equal to a predetermined values then a shift is produced between the intervals of the laser beams sequentially scanned in conjunction with the rotations of the rotary polygon and the photosensitive drum on the photosensitive drum, and the intervals of the plural laser beams projected from the semiconductor laser array. Thus, as shown in FIGS. 20–22, the recording density of the image on the photosensitive drum along the horizontal/vertical directions is different from each other. Accordingly, the resultant image is deformed or contains skips, so that the image deterioration causes a problem. Therefore, as to the multibeam laser recording apparatus in which a plurality of laser diodes are used as the light source, and the surface of the photosensitive drum is simultaneously scanned by the plural laser beams to record the image, when this recording apparatus is manufactured, or is transported to the user for installation purpose, otherwise is repaired, the scanning line intervals of the plural laser beams scanned on the photosensitive drum are adjusted to be equal to a preselected value.

However, the above-described prior art suffers from the following problems. That is, in the above-described multibeam laser recording apparatus in which a plurality of semiconductor lasers are employed as the light source, and the surface of the photosensitive drum is simultaneously scanned by a plurality of laser beams to record the image, as previously stated, the scanning line intervals of the plural laser beams scanned on the surface of the photosensitive drum must be made equal to a preselected value. As a consequence, in the above-explained multibeam laser recording apparatus, when this recording apparatus is manufactured, or is transported to the user for installation purpose, otherwise is repaired, the scanning line intervals of the plural laser beams scanned on the photosensitive drum are adjusted to be equal to a preselected value.

However, even when the scanning line intervals of the plural laser beams are previously controlled so as to be equal to a predetermined value, which are scanned on the photosensitive drum, in the above-described multibeam laser recording apparatus, there are some probabilities that the scanning line intervals of the plural laser beams scanned on the surface of the photosensitive drum are shifted, or deviated from a preselected value, because of the environmental condition variations such as the temperatures, and also the externally applied forces to this recording apparatus while the recording paper is supplied for depletion. When the scanning line intervals of the plural laser beams scanned on the surface of the photosensitive drum are deviated from a predetermined value, as previously explained, there arises such a problem that the resultant image recorded on the photosensitive drum would be deformed, or would contain skips, resulting in deterioration of image qualities.

To solve the above-described problem, the conventional techniques have been proposed as in Japanese Patent Unexamined Publication No. Sho 61-245174 and Japanese Patent Unexamined Publication No. Sho 57-54914.

In the case of the laser printer related to the above-described Japanese Patent Unexamined Publication No. Sho 61-245174, the electric sensing means for sensing the intervals of the laser light is arranged in front of the rotary polygon, and thus the intervals of the laser light may be sensed by this electric sensing means. As a result, the intervals of the laser light sensed by this electric sensing means are different from the intervals of the actually scanned laser light. Therefore, there is such another problem that even when the intervals of the laser light are sensed by the electric sensing means and the control means controls the intervals of the laser light to become constant, the scanning intervals of the laser light scanned on the photosensitive drum are not equal to a preselected value. Thus problem cannot be solved even by employing such a measure that the intervals of the laser light sensed by the electric sensing means are set to be correspondence with the intervals of the laser light scanned on the photosensitive drum in one-to-one correspondence, whereby the intervals of the laser light detected by this electric sensing means are made equal to a predetermined value. That is, the following problem still remains. The resultant intervals of the laser light scanned on the photosensitive drum are not equal to a predetermine value, because of the adverse influences of such optical system as the rotary polygon and the f-θ lens.

Also, in the case of such a plural beam scanning optical system having the variable magnification function, as described in Japanese Patent Unexamined Publication No. Sho 57-54914, the focusing optical system is so arranged to have such an optical means capable of changing the focusing magnification only within the plane perpendicular to the polarizing plane of the light beams deflected by the deflecting means. Although the intervals of the plural beams can be changed, this focusing optical system related to this invention cannot automatically change the intervals of the plural beams. That is, there is such a problem that the intervals of the plural beams cannot be automatically controlled in accordance with the environmental variations and the aging variations.

SUMMARY OF THE INVENTION

The present invention has been made to solve the above-described problems, and therefore has an object to provide a multibeam laser recording apparatus capable of detecting deviation in scanning intervals of plural lasers scanned on an image carrier such as a photosensitive drum, and capable of automatically correcting the intervals of the plural laser beams, thereby being capable of continuously producing an image with a better image quality.

To solve the above-described problems, according to a first aspect of the present invention, there is provided a multibeam laser recording apparatus, comprising: a semiconductor laser array forming a light source; a plurality of laser beams for simultaneously scanning a surface of an image carrier along a main scanning direction to form an image;

scanning line interval detecting means located at a position equivalent to the surface of said image carrier, for detecting scanning line intervals of said plural laser beams scanned on the surface of said image carrier; and control means for controlling the scanning line intervals of said plural laser beams scanned on the image carrier based upon an output derived from said scanning line interval detecting means in such a manner that said scanning line intervals are kept constant.

Also, according to a second aspect of the invention, said scanning line interval detecting means is arranged at an optical length position equivalent to said image carrier and comprises a one-dimensional CCD sensor an image data scanning direction of which is identical to a direction perpendicular to the main scanning direction of the laser beams.

Further, according to a third aspect of the invention, said scanning line interval detecting means is arranged at an optical path length position equivalent to said image carrier and comprises a photosensor having an opening portion inclined with respect to the main scanning direction of said laser beams within the scanning plane.

Furthermore, according to a fourth aspect of the invention, said scanning line interval detecting means are continuously arranged at an optical path length position equal to said image carrier, located perpendicular to each other and inclined with respect to the main scanning direction of the laser beam within the scanning plane.

Further, according to a fifth aspect of the invention, said control means compares outputs with each other, which corresponds to a plurality of opening units of said scanning line interval detecting means, and controls the scanning timings of the laser beams in such a manner that the detected intervals of said plural laser beams corresponding to the respective opening units become equal to each other.

Furthermore, according to a sixth aspect of the invention, said scanning line interval detecting means is arranged at an optical path length position equivalent to said image carrier and comprises a position detecting element with a detecting direction perpendicular to the main scanning direction of the laser beams within the scanning plane.

Also, according to a seventh aspect of the invention, said image carrier comprises a photosensitive member for forming an electrostatic latent image by the irradiation of the laser beams; and said scanning line interval detecting means comprises a potential sensor for detecting a potential at the photosensitive member and calculates scanning intervals of the simultaneously scanned laser beams along a sub-scanning direction by forming on said photosensitive member, an exposed image of a measuring pattern which is extended along the main scanning direction of the laser beams and is regularly repeated along the sub-scanning direction, by detecting a potential change in said exposed image by said scanning line interval detecting means.

Moreover, according to an eighth aspect of the invention, said image carrier is a photosensitive member for forming an electrostatic latent image by being irradiated by the laser beams; and said scanning line interval detecting means is a photosensor arranged opposite to the photosensitive member, forms on said photosensitive member, an exposed image of a measuring pattern which is extended along the main scanning direction of the laser beams and is regularly repeated along the sub-scanning direction, and detects a developed image obtained by developing said exposed image.

Furthermore, according to a ninth aspect of the invention, said measuring pattern comprises a pattern having a period equal to the scanning interval of the simultaneously scanned laser beams along the sub-scanning direction, monitors a repetition spatial frequency distribution of the measuring pattern based upon the output from said scanning line interval detecting means, and controls the scanning line intervals in such a manner that when the number of laser beams is assumed as "n", an intensity ratio of a frequency of the measuring pattern to a frequency equal to 1/n frequency of said measuring pattern becomes maximum.

Also, according to a tenth aspect of the invention, said control means controls the scanning line intervals of the simultaneously scanned laser beams along the sub-scanning direction by controlling an interval of a combined cylinder lens to vary a magnification thereof along the sub-scanning direction.

Further, according to an eleventh aspect of the invention, said control means controls the scanning line intervals of the simultaneously scanned laser beams along the sub-scanning direction by changing a rotation speed of a rotary polygon mirror.

Furthermore, according to a twelfth aspect of the invention, said control means controls the scanning line intervals of the simultaneously scanned laser beams along the sub-scanning direction by varying a speed of the image carrier.

In addition, according to a thirteenth aspect of the invention, said control means also controls pixel intervals of the simultaneously scanned laser beams along the main scanning direction by varying a frequency of an image writing signal.

Additionally, according to a fourteenth aspect of the invention, said scanning line interval detecting means also owns a function as image sync signal detecting means.

The above-described technical means are operated as follows.

That is, according to the multibeam laser recording apparatus basically according to the first aspect of the present invention, the scanning line interval detecting means detects the scanning line intervals of the plural laser beams scanned on the surface of the image carrier at such a position equivalent to this surface of the image carrier, and the control means controls the scanning line intervals of the plural laser beams scanned on the surface of the image carrier to continuously become constant based upon the detection output of the scanning line interval detecting means. As a result, the images with better image qualities can be continuously produced.

The above and other objects and features of the present invention will be more apparent from the following description taken in conjunction with the accompanying drawings.

DETAILED DESCRIPTION OF THE PREFERRED EMBODIMENTS

The present invention will now be described based upon various embodiments shown in drawings.

Figure 2:
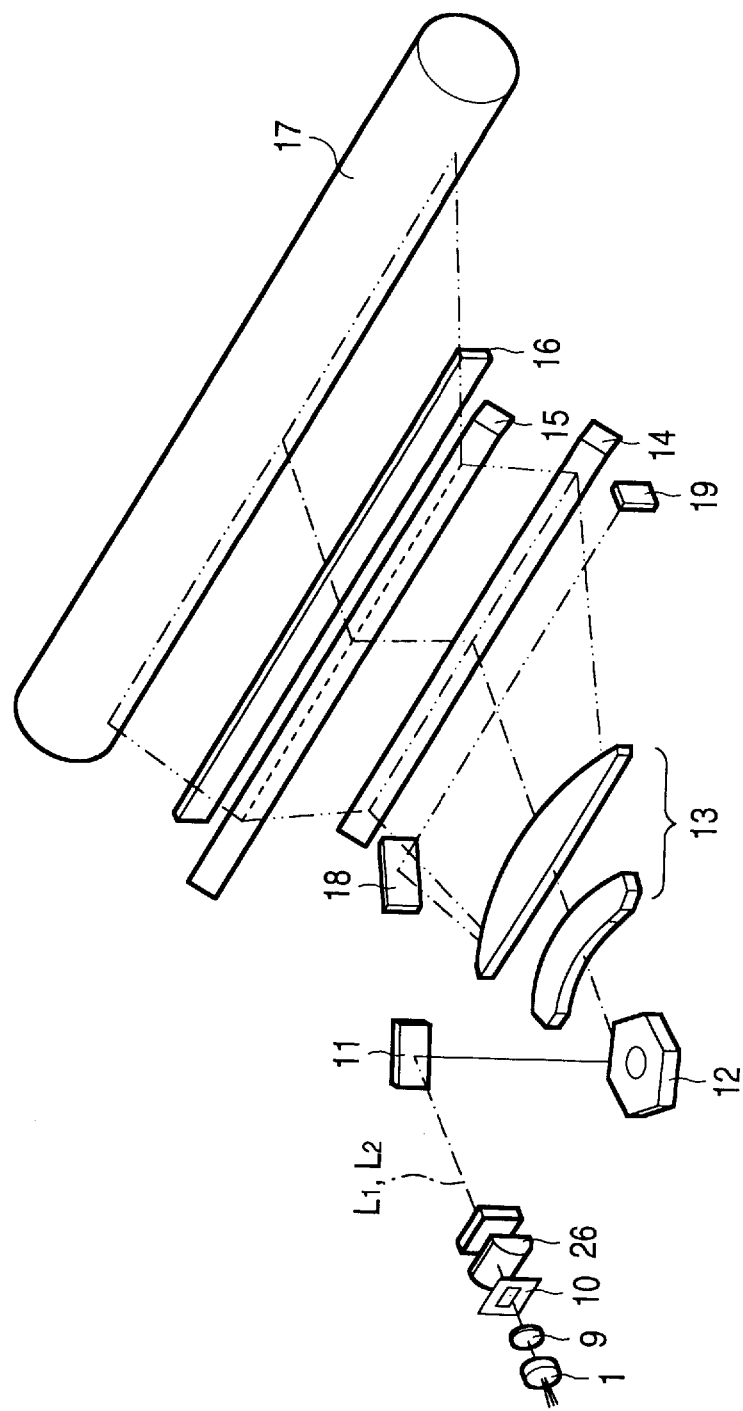
FIG. 2 is a structural diagram showing a basic structure of the multibeam laser recording apparatus according to the embodiment of the present invention.

FIG. 2 represents a basic arrangement of a multibeam laser recording apparatus according to a first embodiment of the present invention.

Figure 3:
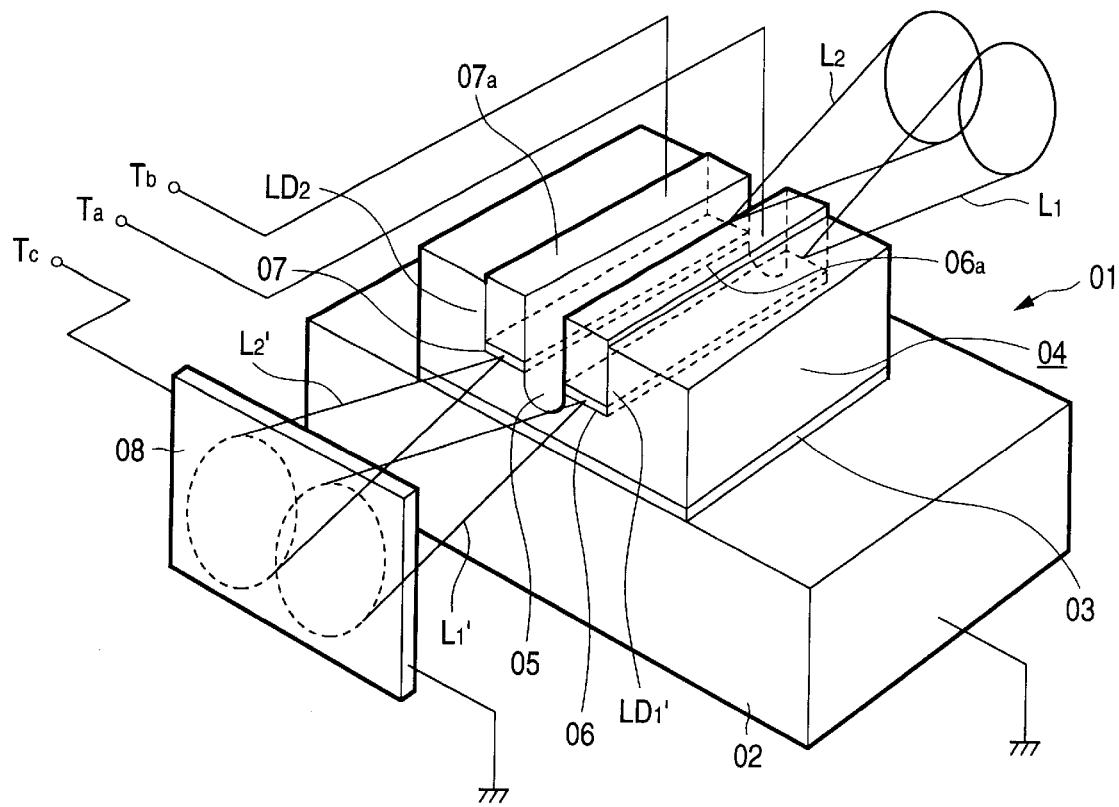
FIG. 3 is a perspective view showing a structure of a semiconductor laser array.

In FIG. 2, reference numeral 1 indicates a multibeam diode laser array. This diode laser array 1 is equipped with two laser diode chips. The diode laser array 1 projects two laser beams L1 and L2. As shown in FIG. 3, the multibeam diode laser array 1 includes an electrode substrate 2 at a lower surface thereof and an LD (laser diode) chip 3 mounted on this electrode substrate 2. The LD chip 3 is equipped with laser diodes LD1 and LD2 having two oscillating regions 6 and 7 separated by an insulating laser 5 above the chip substrate 4. It should be noted that an interval between the laser diodes LD1 and LD2 (namely, interval between the oscillating regions 6 and 7) is "r1". Then, when a drive current is supplied from connection terminals Ta, Tb connected to an LD drive circuit (not shown) via electrodes 6a, 7a. The respective laser diodes LD1 and LD2 project first and second laser beams L1 and L2 along the forward direction, and projects back beams L1' and L2' along the backward direction. Generally speaking, it should be understood that since the Diameters of the laser beams L1 and L2 which are projected in such a direction parallel to the hetero boundary surface are small, e.g., 1 to 4 micrometers, namely cannot be defined, a dimension of these laser beams functioning as a light source is expressed by a spread angle "θ1".

The laser array 1 Includes a photodiode B. This photodiode 8 is so arranged as to receive the above-described back beams L1' and L2' and to output light amount signals to a connection terminal Tc connected to a light control circuit (not shown).

The two sets of laser beams L1 and L2 projected from the multibeam diode laser array 1 constructed in the above-described arrangement are converted into collimated light beams by way of a collimate lens 9, as shown in FIG. 2. Thereafter, the collimated light beams are reflected via a mirror 11 via an aperture 10 for shaping the laser beams, and the reflected light beams are illuminated onto a mirror-processed side surface of a rotary polygon 12 functioning as a light scanning apparatus. The above-described collimate lens 9, aperture 10, and mirror 11 constitute a first focusing optical system involving a zooming cylindrical lens (will be discussed later). The laser beams L1 and L2 illuminated onto the side surface of the rotary polygon 12 are reflected by the mirror-processed side surface thereof in connection with the rotation operation of this rotary polygon 12, and then are deflected at a preselected angle with respect to both sides of the optical axis for scanning purposes. The laser beams L1 and L2 deflected/scanned by the rotary polygon 12 are reflected by a reflection mirror 14 via an f-θ lens 13, and also are narrowed by a cylindrical mirror 15 along the sub-scanning direction. Then, the resultant laser beams L1 and L2 are focused onto a surface of a photosensitive drum 17 functioning as an image carrier via a window 16 having a preselected interval. The focused laser beams are scanned in parallel to each other along the axial direction of this photosensitive drum 17 for exposure purpose. The above-described f-θ lens 13, reflection mirror 14, cylindrical mirror 15, and window 16 constitute a second focusing optical system.

Also, the above-described laser beams L1 and L2 which are deflected/scanned by the rotary polygon 12 and are focused by the f-θ lens 13 are reflected by a mirror 18 arranged at one end portion of these laser beams along the scanning direction between the f-θ lens 13 and the reflection mirror 14, and further are illuminated onto a light receiving element 19 arranged at the other portion (opposite side) of the laser beams L1 and L2. Since the laser beams L1 and L2 are detected by this light receiving element 19, scanning start positions (image writing timings) of the laser beams L1 and L2 on the photosensitive drum 17 can be controlled based on the detected signals. It should be noted that the light receiving element 19 receives the laser beams L1 and L2 via the reflection mirror 14, and an optical path length defined from the light source to this light receiving element 19 is set to be equal to another optical path length defined from this light receiving element 19 to the surface of the photosensitive drum 17.

On the other hand, in the multibeam laser recording apparatus according to this embodiment, it is arranged by a scanning line interval detecting means located at a position equivalent to the surface of the image carrier, for detecting scanning intervals of a plurality of laser beams scanned on this image carrier, and a control means for controlling the scanning line intervals of the plural laser beams to be kept constant, which are scanned on the image carrier, based upon the output of this scanning line interval detecting means.

The position equivalent to the surface of the image carrier means is a position different from the surface of the image carrier but having an equivalent optical path length extending from the laser source to the surface of the image carrier.

Figure 1:
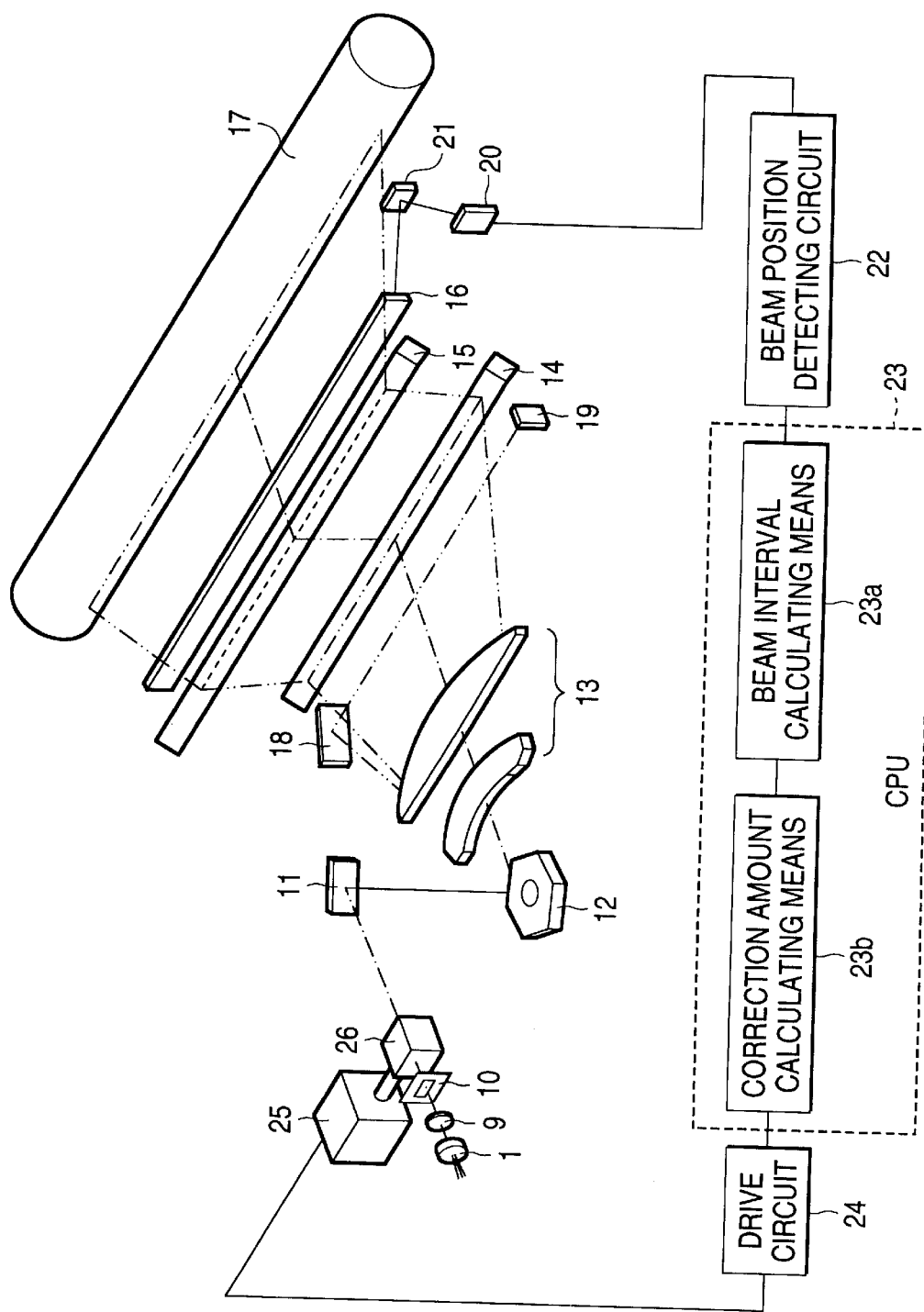
FIG. 1 is a structural diagram showing a multibeam laser recording apparatus according to an embodiment of the present invention.

As shown in FIG. 1, the laser beam is directed to the CCD which is at a position equivalent to the surface of the image carrier after being deflected by the mirror 21. In the case where the laser beam reaches the surface of the image carrier without being deflected by the mirror 21, the optical path length extending from a reflected point of the laser beam on the mirror 21 to the surface of the image carrier is equivalent to an optical path length extending from a reflected point of the laser beam to the CCD 20. With such an arrangement, when the laser beam reaches the surface of the image carrier without being deflected by the mirror 21, an image having the same magnifications in both the main and sub scanning directions as those of an imaging formed on the surface of the image carrier are imaged on the CCD 20. Consequently, a displacement of the beam intervals having an imaging on the surface of the image carrier can be accurately measured by the CCD 20.

In other words, as illustrated in FIG. 1, at a position equivalent to the surface of the photosensitive drum 17, a scanning line interval detecting means 20 is arranged which detects an interval of the two sets of laser beams L1 and L2 scanned/exposed on the surface of this photosensitive drum 17. In this embodiment, a one-dimensional CCD (charge-coupled device) is employed as this scanning line interval detecting means 20 in this embodiment. This CCD 20 is arranged between the window 16 and the photosensitive drum 17 in such a manner that the laser beams L1 and L2 can be received via the mirror 21 at one end portion of these laser beams L1 and L2 along the scanning direction. The position of this CCD 20 is a position optically equivalent to the surface of the photosensitive drum 17. The one-dimensional CCD 20 is arranged along the sub-scanning direction perpendicular to the main scanning direction corresponding to the scanning direction of the laser beams L1 and L2. The scanning direction of the image data by this CCD 20 itself is identical to the sub-scanning direction. Moreover, the scanning period is made equal to the sub-scanning period of the multibeam scanning apparatus. Accordingly, the light amount distribution obtained when the laser beams L1 and L2 have passed over the CCD 20 may be detected as the output of the CCD 20.

The accuracy in attachment of all the optical elements is gradually changed, respectively, by the influence of temperature and moisture, an external force, etc., as a time elapses.

For that reason, according to this embodiment, it is so designed that the scanning line interval is detected at a position equivalent to the surface of the image carrier by the CCD 20 for a beam immediately before it is incident to the image carrier through all the optical elements. As a result, a total change of all the optical elements as a time elapses can be detected by a single detector.

Also, a plane mirror can remarkably reduce an error in deflection to be given to the deflection beam at the time of deflecting the beam, and a beam image of the equivalent magnification due to the plane mirror is detected by the CCD 20. As a result, the gradual change of all the optical elements as a time elapses can be detected at a high accuracy.

Figure 4A:
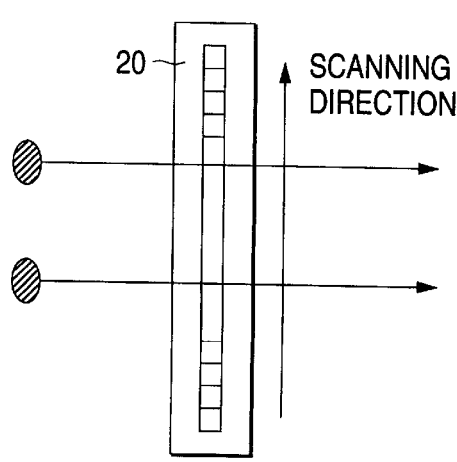
FIGS. 4A and 4B are a structural diagram and a signal waveform diagram showing an scanning line interval detecting means, respectively.
Figure 4B:
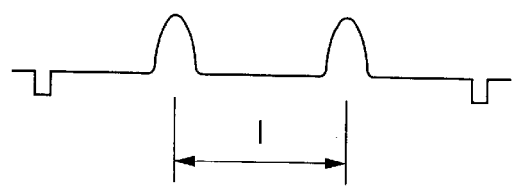

FIG. 4A shows a relationship between the CCD 20 and the laser beams L1 and L2, and FIG. 4B indicates a detection output of the CCD 20. Two sets of laser beams L1 and L2 are simultaneously turned ON to scan the surface of the CCD 20, so that the scanned output is obtained from the CCD 20 as indicated in FIG. 4B. As shown in FIG. 1, the output from the CCD 20 is inputted to a beam position detecting circuit 22. In this beam position detecting circuit 22, the positions of two sets of the laser beams L1 and L2 are detected by employing the pixel data derived from the CCD 20. In this case, as illustrated in FIG. 4B, the respective positions of the laser beams L1 and 12 are detected by obtaining gravity centers of the beam profile. Since the pixel intervals of the CCD 20 functioning as the scanning line interval detecting means are constructed in high precision, high detecting precision about the laser beam position and the intervals can be achieved.

The positional data about two sets of laser beams L1 and L2 detected by the beam position detecting circuit 22 are inputted to a CPU 23 which functions as a beam interval calculating means 23a and a correction amount calculating means 23b, as shown in FIG. 1. As the CPU 23 functions as this beam interval calculating means 23a, the scanning intervals of two sets of laser beams L1 and L2 are calculated based on the positional data derived from the beam position detecting circuit 22. The scanning interval data of tile laser beams L1, L2 calculated by the beam interval calculating means 23a is supplied to the CPU 23 functioning as the correction amount calculating means 23b by which a correction amount of the laser beam interval is calculated. Then, in response to this correction amount calculated by the correction amount calculating means 23b, an actuator 25 is driven via a drive circuit 24 so as to vary a magnification of a zooming cylindrical lens 26. As a consequence, the intervals of the scanning lines by the laser beams L1 and L2 can be maintained by the proper values.

Figure 5A:
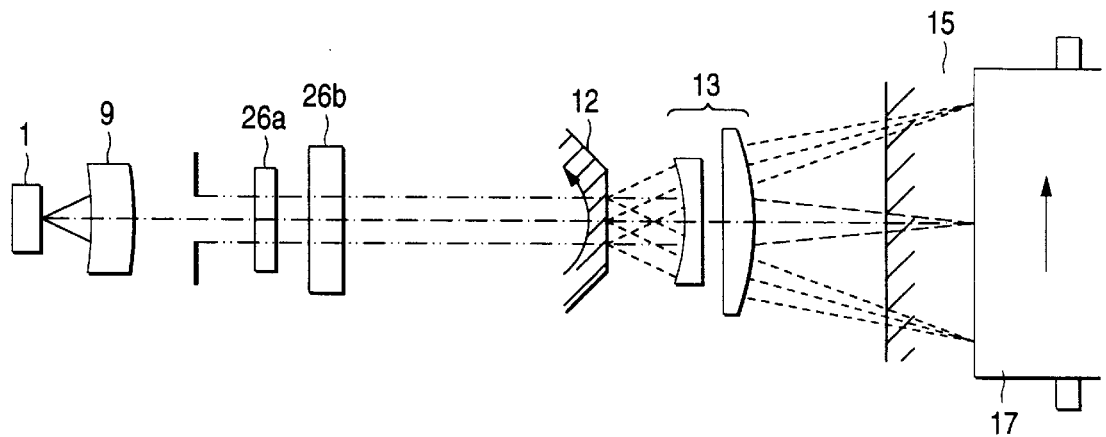
FIGS. 5A and 5B are a plan view and a side view showing an optical system of the multibeam laser recording apparatus, respectively.
Figure 5B:
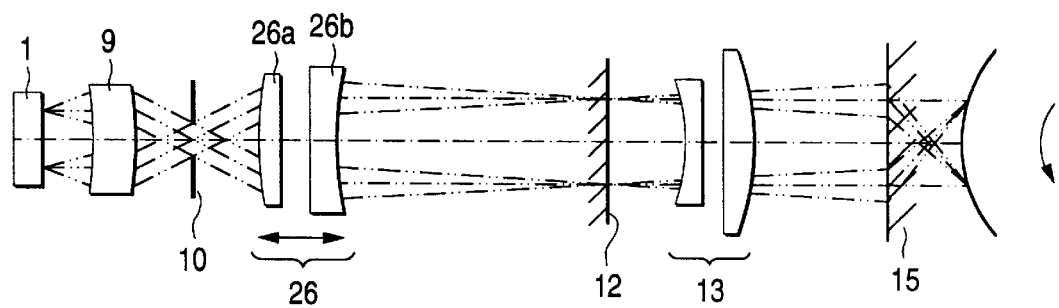

As indicated in FIG. 5b, the above-described zooming cylindrical lens 26 is constructed of a combination between one sheet of convex lens 26a and one sheet of concave lens 26b. This convex lens 26a has optical power only along the sub-scanning direction, namely the scanning direction perpendicular to the main scanning direction. At least one of these convex lens 26b and concave lens 26a is movable along the optical axis direction Then, this zooming cylindrical lens 26 has the optical power only along the sub-scanning direction (scanning direction perpendicular to the main scanning direction), and also the variable transverse magnification. Thus, the scanning intervals of the two laser beams L1 and L2 can be controlled, or adjusted.

Here, the adjustment of the beam intervals may be performed by changing the interval between the two sheets of cylinder lenses 26a and 26b, and also the position thereof. As a consequence, a stepper motor is connected to each of these lenses so as to move the lenses along the optical axis direction. The data about the lens position/magnification are previously stored in a ROM or the like as a memory table before being marketed. When the beam interval is detected by the detecting means, a ratio "γ" of the detected interval to the original beam interval is calculated, which will then be recognized as a presently set magnification "B". Then, lens positional data which constitutes a new magnification B/γ is obtained. Based on this positional data, the respective lens positions are changed to adjust the intervals of the two laser beams. After the adjustment operation is completed, the beam interval is again measured. When the measurement result is located within a predetermined error, this interval adjustment is completed. Conversely, when the measurement result contains a preselected error or more errors, the interval adjustment is again adjusted.

Figure 6A:
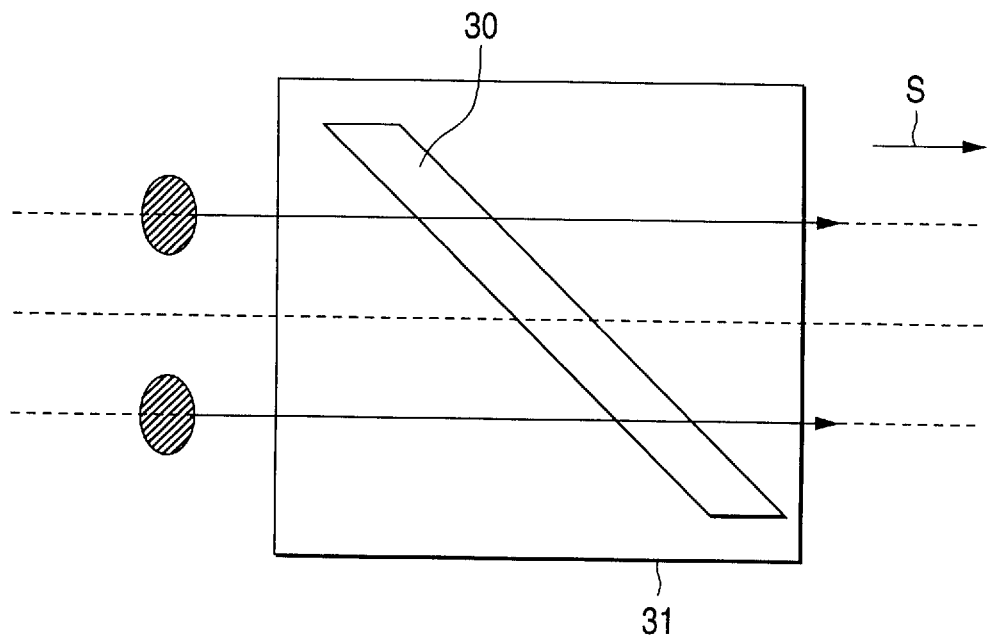
FIGS. 6A and 6B are a structural diagram and a signal waveform diagram showing a modification of the scanning line interval detecting means.
Figure 6B:
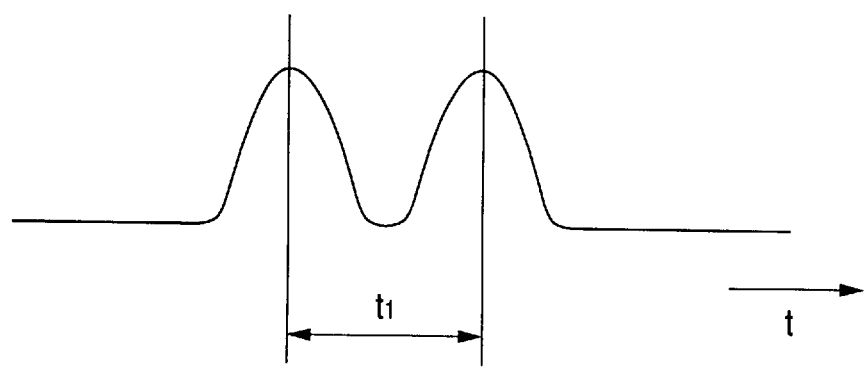

FIGS. 6A and 6B schematically indicate a modified example of the above-described scanning line interval detecting means. In this modification, as the scanning line interval detecting means 20, a photosensor 31 having a slit-shaped opening portion 30 is employed. This slit-shaped opening portion 30 is arranged at an inclined angle of 45 degrees with respect to the main scanning direction S. As a result, even when two sets of laser beams L1 and L2 are scanned at the same time, since the slit-shaped opening portion 30 is positioned in front of the photosensor 31 under the inclined condition at 45 degrees with respect to the main scanning direction, these two laser beams L1 and L2 are sensed by this photosensor 31 with a time difference by "t1", as represented in FIG. 6B. As a consequence, the interval between two sets of laser beams L1 and L2 may be obtained by the beam interval calculating means 23a based upon such a time interval "t1" of two peaks and a scanning speed Vs of these laser beams L1 and L2, which are calculated from the sensor outputs of this photosensor 31.

Figure 7A:
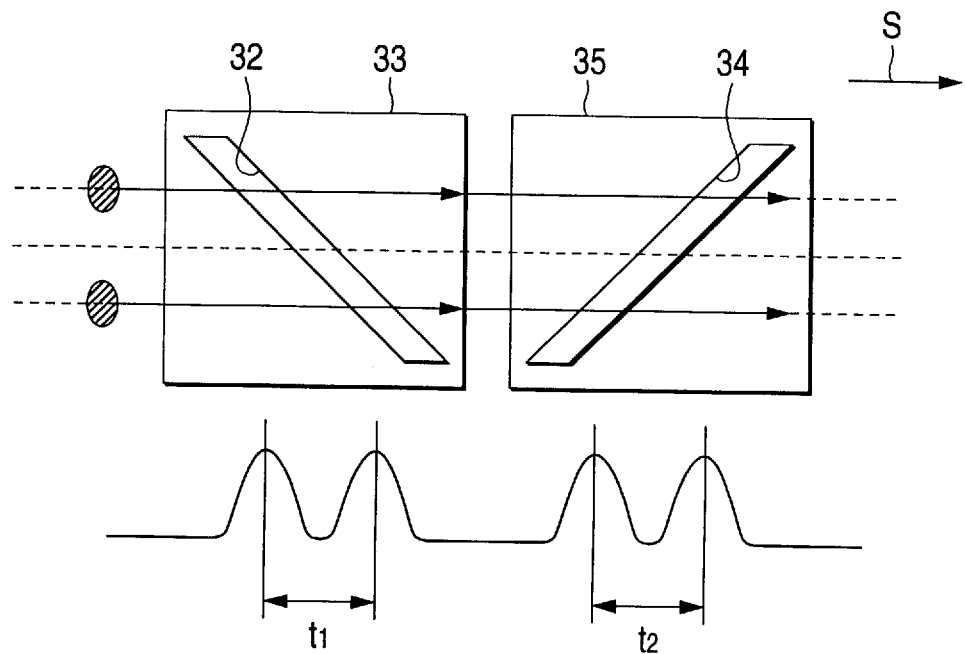
FIGS. 7A and 7B are a structural diagram and a signal waveform diagram showing another modification of the scanning line interval detecting means.
Figure 7B:
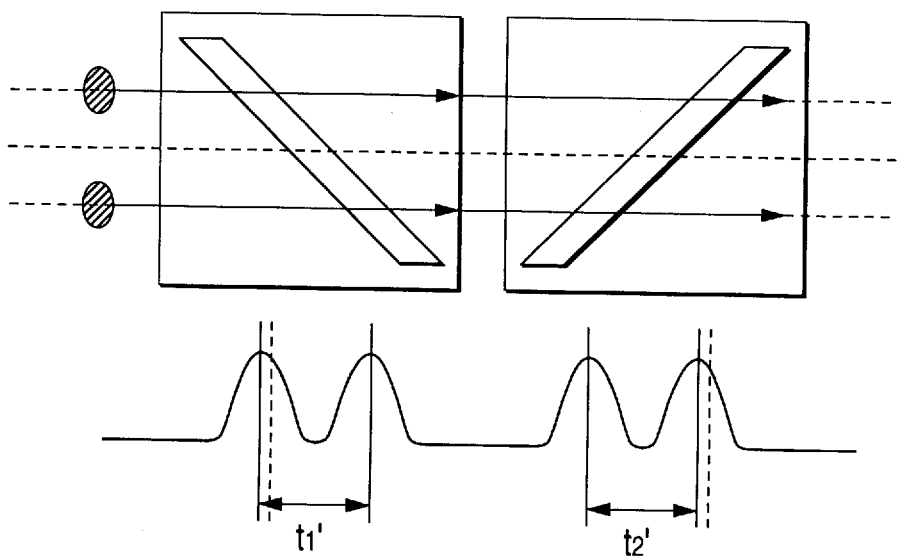

Moreover, FIGS. 7A and 7B indicate another modified example of the above-explained scanning interval detecting means. As shown in FIG. 7A, a first photosensor 33 having a slit-shaped opening portion 32 having a first 45-degree inclination, and a second photosensor 35 having a slit-shaped opening portion 34 perpendicular to this first photosensor 33 are arranged in the same scanning line to detect the two laser beams L1 and L2 in a similar manner to that of the first-mentioned modification. In this modification, when there is no tilt in the laser beams L1 and L2 (namely, no positional shift between the plural laser beams along the main scanning direction), such a sensor output as shown in FIG. 7A is obtained, and then a time interval "t1" of peaks obtained from the prestaged photosensor 33 becomes equal to another time interval "t2" of peaks obtained from the poststaged photosensor 35, namely t1=t2=t. As a consequence, based upon the time interval "t" of the peaks of the two laser beams L1 and L2, and the scanning speed Vs of these laser beams L1 and L2, a beam interval between the two sets of laser beams L1 and L2 can be obtained.

On the other hand, when the two laser beams L1 and L2 contain a tilt, a sensor output is produced as indicated in FIG. 7B. Although a time interval t1' of peaks obtained from the prestage photosensor 33 is different from a time interval t2' of peaks obtained from the postage photosensor 35, an average time (t1'+t2')/2 is equal to the above-described time interval "t" in the case of no tilt in the two laser beams. Similar to the above explanation, the interval between the two laser beams L1 and L2 can be obtained based upon the time interval "t" and the scanning speed Vs of the laser beams L1 and L2. A shift, or deviation Δt between the time interval of the peaks when the laser beams L1 and L2 tilt and the time interval of the original peaks may be calculated from (t1'−t2')/2, and a symbol thereof indicates a tilt direction. Based upon the above-described shift Δt and the scanning speed Vs of the laser beams L1 and L2, since the deviation amount caused by the beam tilt along the main scanning direction can be obtained, not only the laser beam interval by the effect of this embodiment, but also the shift of the image writing position caused by the tilt by the laser beams L1 and L2 may be corrected by adjusting the image writing timings by one of these laser beams.

In accordance with the above-described arrangement, the signal produced when one laser beam passes through the photosensor is employed as the image sync signal, so that the laser beam sensing means 19 is no longer additionally provided. Accordingly, the laser beam interval may be detected without making the arrangement of the laser beam recording apparatus complex.

In the multibeam laser recording apparatus with the above-described structure, according to this embodiment, the shift, or deviation in the scanning line intervals of the plural laser beams on the photosensitive drum is detected in accordance with the below-mentioned manner, and the scanning line intervals of the plural laser beams is corrected based on this detected deviation. Accordingly, the images with better image quality can be continuously obtained. In other words, in the case of the above-described multibeam laser recording apparatus, as shown in FIG. 3, the two laser diodes LD1 and LD2 of the multibeam laser diode array 1 are separately modulated by an LD drive circuit (not shown) in response to the image data, and two sets of laser beams L1 and L2 are projected from the two laser diodes LD1 and LD2 of this multibeam diode laser array 1. The two sets of laser beams L1 and L2 projected from this multibeam diode laser array 1 are converted into collimated laser beams by a collimate lens 19, as shown in FIG. 1. Thereafter, the collimated laser beams are reflected by a mirror 11 via an aperture 10 for shaping the laser beams, and are illuminated on to the mirror-processed side surface of the rotary polygon 12. The laser beams L1 and L2 illuminated on the side surface of this rotary polygon 12 are reflected thereon in conjunction with the rotation operation of this rotary polygon 12, and are deflected/scanned so as to be inclined at a predetermined angle with respect to the optical axis. Then, the deflected/scanned laser beams are focused via the f-θ lens 13, reflection mirror 14, cylindrical mirror 15, and window 16 on the surface of the photosensitive drum 17 with having a predetermined interval. The focused laser beams are scanned/exposed in parallel thereto along the axial direction of this photosensitive drum 17.

At this time, the scanning interval of the two sets of laser beams L1 and L2 scanned/exposed on the photosensitive drum 17 can be determined by the interval "r1" between the two laser beams LD1 and LD2 of the multibeam diode laser array 1, and the focusing characteristics of the collimate lens 9, the f-θ lens 13 and the cylindrical mirror 15. The scanning interval of these two laser beams L1 and L3 are previously set to a predetermined value.

However, even when the interval between the two sets of laser beams L1 and L2 scanned on the photosensitive drum 17 is preset to be equal to a predetermined value in the above-described multibeam laser recording apparatus, there are some possibilities that the interval between the two sets of laser beams L1 and L2 scanned on the photosensitive drum 17 are deviated from a preselected value due to changes in such an environmental condition as temperatures, and external force applied to this laser recording apparatus when a paper jam treatment is carried out, and the laser recording apparatus is transferred.

In this embodiment, when the power supply of the multibeam laser recording apparatus is turned ON, or the paper jam happens to occur, and further after a preselected sheet of recording papers have been printed out, as indicated in FIG. 1, the laser beams L1 and L2 are detected by the one-dimensional CCD 20 functioning as the scanning interval detecting means at a position equivalent to the surface of the photosensitive drum 17. Then, the sensor output from this CCD 20 is inputted to a beam position detecting circuit 22 by which the positions of these two laser beams L1 and L2 are detected. The positional data about the two laser beams L1 and L2 detected by the beam position detecting circuit 22 are inputted to the CPU 23 having the functions as the beam interval calculating means 23a and the correction amount calculating means 23b. In the CPU 23 functioning as this beam interval calculating means 23a, the scanning interval between the two laser beams L1 and L2 is calculated based upon the positional data derived from the beam position detecting circuit 22. In response to the correction amount obtained by the correction amount calculating means 23b, the actuator 25 is driven via the drive circuit 24 to change the magnification of the zooming cylindrical lens 26. As a result, the interval of the scanning lines of the laser beams L1 and L2 is controlled to be equal to a predetermined value. This correction amount calculating means 23b calculates the correction amount by employing for instance, a memory table.

As described above, the multibeam laser recording apparatus of this embodiment is so arranged that the scanning interval between the two sets of laser beams L1 and L2 scanned/exposed on the sensitive drum 17 is detected by the CCD 20 at the position equivalent to the surface of the photosensitive drum 17, and the magnification of the zooming cylindrical lens 26 is varied based on the detection result of the scanning interval between these laser beams L1 and L2 in order that the interval of the scanning lines of these laser beams L1 and L2 is equal to a predetermined value. As a consequence, even when the interval of the two laser beams L1 and L2 scanned on the photosensitive drum 17 is deviated from a predetermined value due to the environmental condition changes such as the temperature, and the external force exerted to this multibeam laser recording apparatus when the paper jam trouble is treated, or the multibeam laser recording apparatus is moved, this internal can be automatically adjusted so as to be equal to a predetermined value. Then, the image with better image quality can be continuously obtained.

Also, in this embodiment, the scanning interval of the two laser beams L1 and L2 is corrected as follows. That is, the cylindrical lens 26 having the optical power only along the sub-scanning direction is employed as a zooming optical system, and the magnification of this zooming optical system is varied, so that the beam interval on the surface of the photosensitive drum 17 is varied. As a consequence, since the zooming optical system 26 is employed, both of the rotary polygon 12 arid the surface of the photosensitive drum 17 have a conjugate relationship so as to avoid the adverse influence of the rotary polygon 12. If the magnification is changed by moving the normal cylindrical lens along the forward/backward directions, then a conjugate relationship between the semiconductor laser and the rotary polygon would no longer be satisfied. As a result, a shift would be produced also in the focusing position on the surface of the photosensitive drum 12, and a spot size on the photosensitive drum 17 would be changed, resulting in deterioration of the image quality. However, since the cylindrical lens 26 having the power only along the sub-scanning direction is employed as the zooming optical system, the conjugated relationship between the rotary polygon 12 and the surface of the photosensitive drum 17 does not collapse, but the beam interval on the surface of the photosensitive drum 17, namely the scanning line interval can be kept constant.

Figure 8:
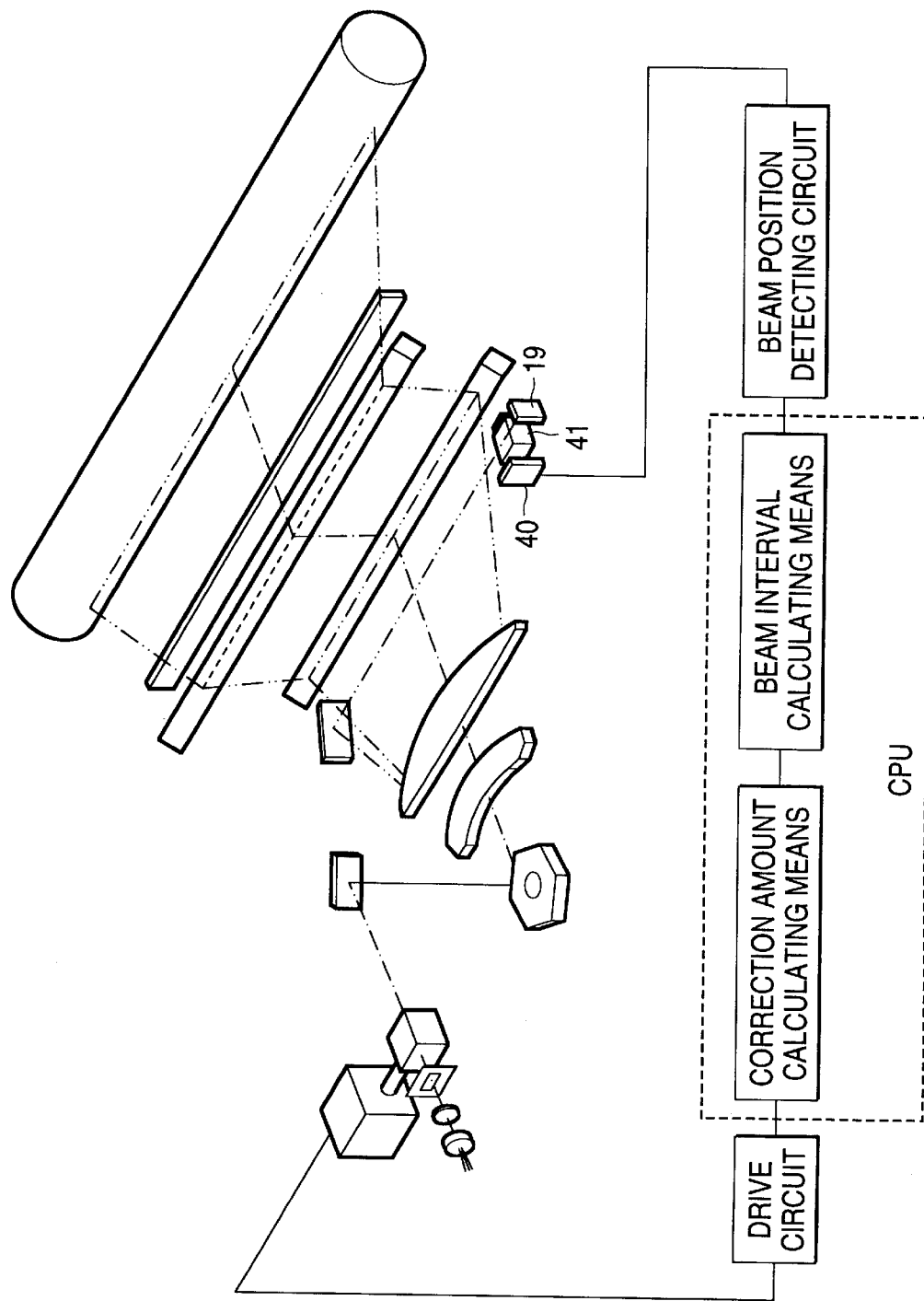
FIG. 8 is a structural diagram showing a multibeam laser recording apparatus according to a second embodiment of the present invention.

FIG. 8 schematically shows a second embodiment according to the present invention. The same reference numerals as shown in the preceding embodiment will be used to indicate the same or similar elements in this embodiment In this embodiment, a detection of a laser beam and a detection of a scanning line interval between laser beams are carried out at the same position, and the detection of the scanning line interval between the laser beams is performed by a one-dimensional position detecting element.

That is, in this embodiment, as shown in FIG. 8, a one-dimensional position detecting element 40 functioning as a scanning line interval detecting means is arranged at the same position as a light receiving element 19 used to determine scan starting positions of laser beams L1 and L2 (namely, image write timings) on a photosensitive drum 17. Furthermore, this one-dimensional position detecting element 40 is arranged along the sub-scanning direction at a position equivalent to the surface of the photosensitive drum 17 in a similar manner to the embodiment 1. In FIG. 8, it is so arranged that the laser beams L1 and L2 pass through the position detecting element 40 at the same timing as a beam position detecting signal outputted from the light receiving element 19 for determining the image write timing. As a consequence, a beam splitter 41 is arranged in front of the light receiving element 19 and the CCD 20 in such a manner that the light path length defined by the laser beams L1 and L2 irradiated to the light receiving element 19 is equal to the light path length defined by the laser beams L1 and L2 irradiated to the CCD 20 by way of this beams splitter 41.

As illustrated in FIG. 9, in this embodiment second, a beam position detection signal 42 outputted from the light receiving element 19 is used as a trigger, and the output from the position detecting element 40 is processed by a sample/hold operation and an A/D conversion to obtain a beam position output. It should be noted that when the plural laser beams L1 and L2 are scanned while being simultaneously turned ON in this arrangement, these laser beams are detected as a position where the plural laser beams L1 and L2 are synthesized with each other. As a result, it is necessary to detect the position every one laser beam by switching the laser to be turned ON every 1 scanning operation. Also, since the beam position detection signal 42 is directly used as the trigger signal of sampling/holding the output from the position detecting element 40, the arrangement shown in FIG. 8 should be required. If the sample/hold timings of the position detection element 40 is determined different from the above-described manner, then the position detecting element 40 may be located at other position.

Figure 9A:
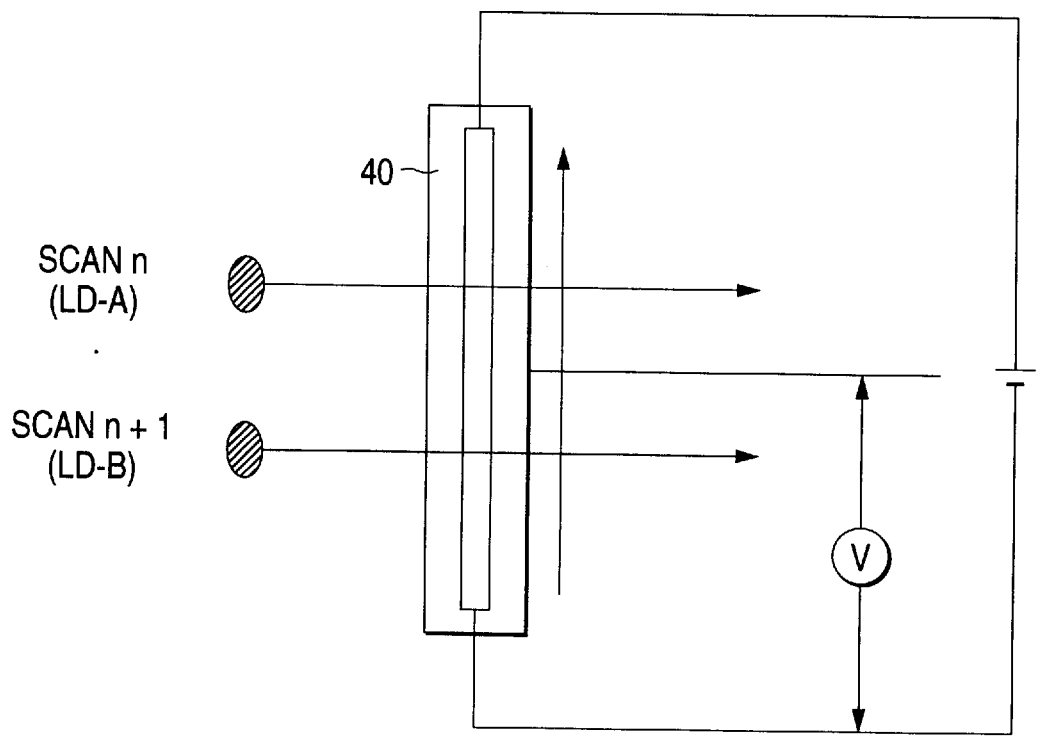
FIGS. 9A and 9B are a structure diagram and a signal waveform diagram showing the scanning line interval detecting means in the second embodiment, respectively.
Figure 9B:
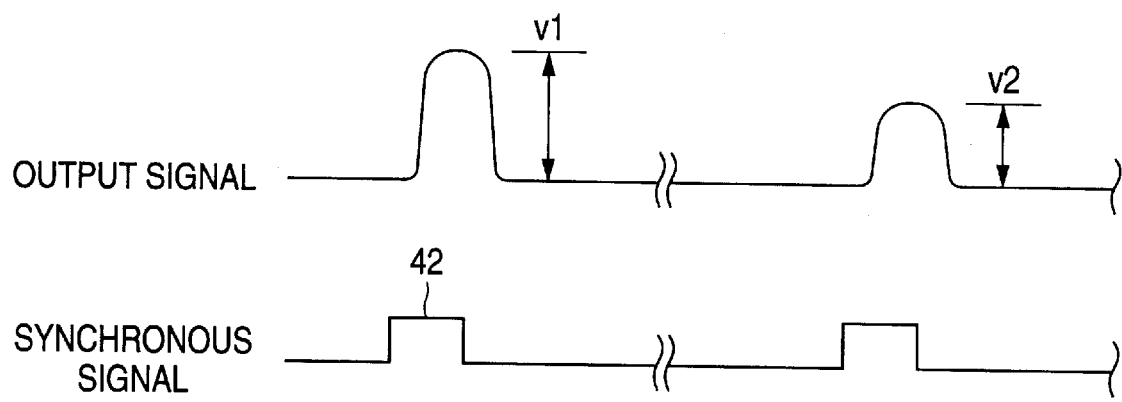

FIG. 9A indicates a relationship between the above-described position detecting element 40 and the laser beams L1 L2, and FIG. 9B represents a condition of an output read out from the position detecting element 40. FIG. 9A and 9B show positions when two sets of laser beams L1 and L2 are employed. According to the position detecting element 40, the positions of the respective laser beams L1 and L2 may be obtained based on the amplitudes of the outputs V1 and V2. The beam interval can be calculated by comparing the outputs V1, V2 obtained in this way with the magnitude) of the outputs V1, V2 which are obtained when the multibeam laser recording apparatus is adjusted so as to be marketed.

Since other arrangement and operations of this multibeam laser recording apparatus are similar to those of the above-explained embodiment, explanations thereof are omitted.

FIGS. 10, 11A, 11B and 11C indicate a third embodiment of the present invention, and the same reference numerals used in the preceding embodiment will be employed as those for denoting the same or similar elements in this embodiment. In this embodiment, laser beams are scanned/exposed on an image carrier to form an electrostatic latent image and also this electrostatic latent image is developed to form a ladder pattern. An interval of the ladder pattern is directly detected, so that the scanning interval between the laser beams L1 and L2 scanned/exposed on the image carrier can be detected.

Figure 11A:
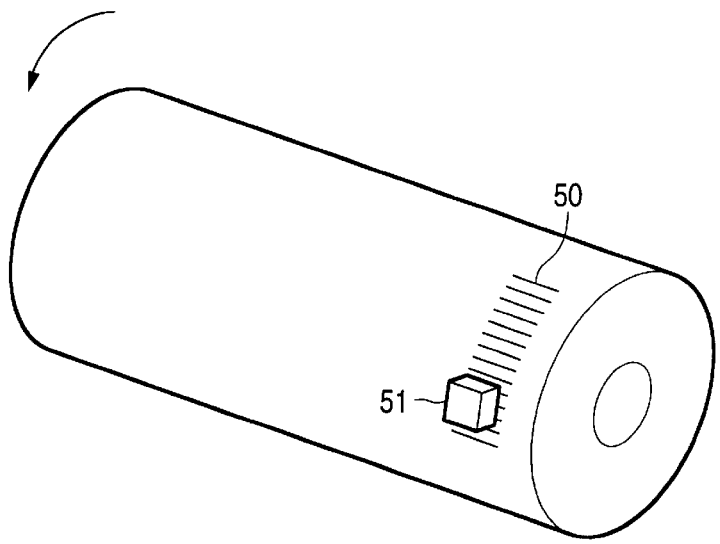
FIGS. 11A, 11B and 11C are a perspective view and side views showing the scanning line interval detecting means in the third embodiment.

FIG. 11A is a perspective view for showing a structure of a unit for detecting a ladder pattern 50 constructed of a toner image formed on the photosensitive drum 17. When the ladder pattern is detected before being developed, a potential sensor is employed as a detecting element 52. When the ladder pattern is detected after being developed, a photo reflector 51 is used to detect this ladder pattern 50. First, to form the ladder pattern 50, a plurality of laser beams are simultaneously turned ON by a laser scanning apparatus, and then a pattern having a predetermined length is repeatedly exposed onto the photosensitive drum 17 in an interval equal to the intervals of the laser beams L1 and L2 along the main scanning direction, and also an output pattern is defined in such a manner that all of the scanning lines have the equal intervals to each other.

Figure 12:
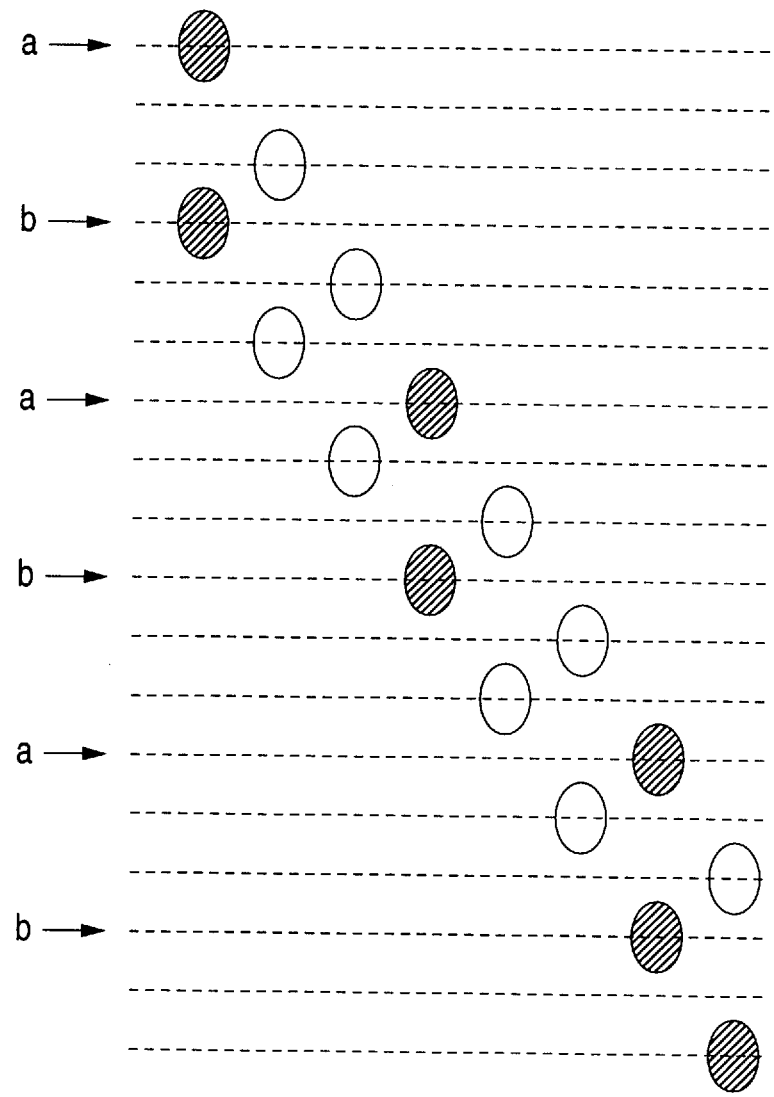
FIG. 12 is a structural diagram showing the interlacing scanning operation of a multibeam laser recording apparatus according to a fourth embodiment of the present invention.
Figure 13:
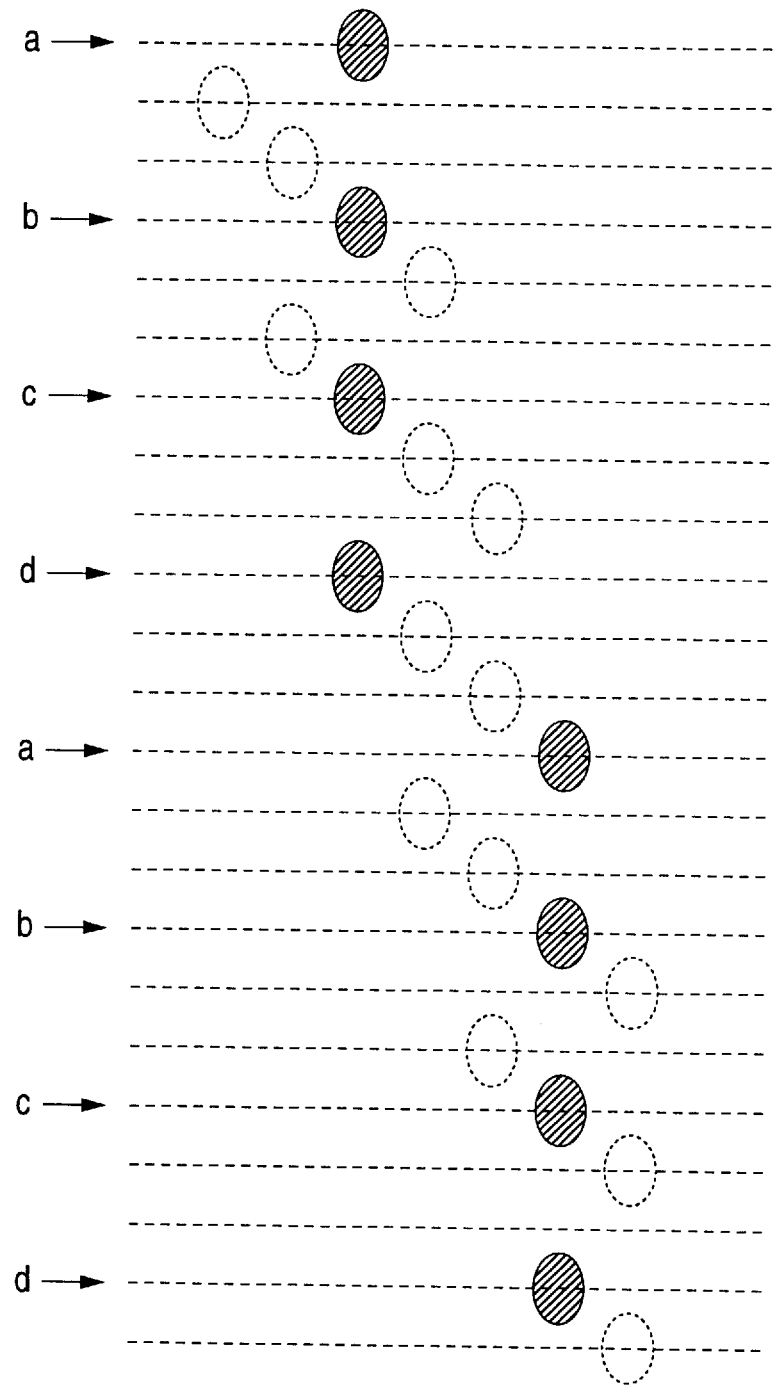
FIG. 13 is a structural diagram showing the interlacing scanning operation of a multibeam laser recording apparatus according to a modification of the fourth embodiment of the present invention.

Also, in such a multibeam laser recording apparatus for interface-scanning the laser beams L1 and L2 one the photosensitive drum 17, assuming now that the interlaced scanning interval is "pline", the ladder pattern 50 may be formed with an p-line interval. Explaining now an example of the two laser beams L1 and L2, as indicated in FIG. 12, two scanning lines "a" and "b" are formed with a 3-line interval at the same time by the laser diode chips LD1 and LD2 during a first scanning operation. Next, two scanning lines "a" and "b" are simultaneously formed by the laser diode chips LD1 and LD2 during a fourth scanning operation. Subsequently, when the scanning lines are successively formed, the scanning lines are repeatedly formed with the 3-line interval. When four laser beams are employed, as shown in FIG. 13, a scanning process is determined.

Figure 14:
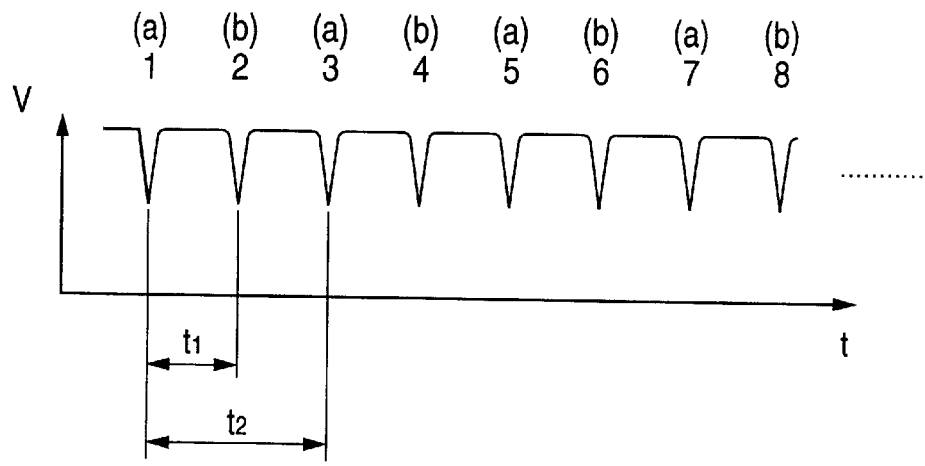
FIG. 14 is a signal waveform diagram showing outputs of the scanning line interval detecting means.

In FIG. 14, there is shown an example of an output signal obtained when the ladder pattern 50 formed in the above-described manner is detected by the detecting element 52. In this drawing, reference numerals 1, 2, 3, - - - indicate the number of this ladder pattern 50 The even numbers represent a change in outputs corresponding to the images exposed by the laser diode chip LD1, whereas the odd numbers show a change in outputs corresponding to the images exposed by the laser diode chip LD2. Based upon this output, a time "t1" corresponding to the interval between either the pattern 1 and the pattern 2, or the pattern 3 and the pattern 4, arid a time "t2" corresponding to the interval between either the pattern 1 and the pattern 3, or the pattern 2 and the pattern 4 are obtained The above-described ladder patterns 50 repeatedly detected several times to be averaged in order to improve the detecting precision.

Figure 10:
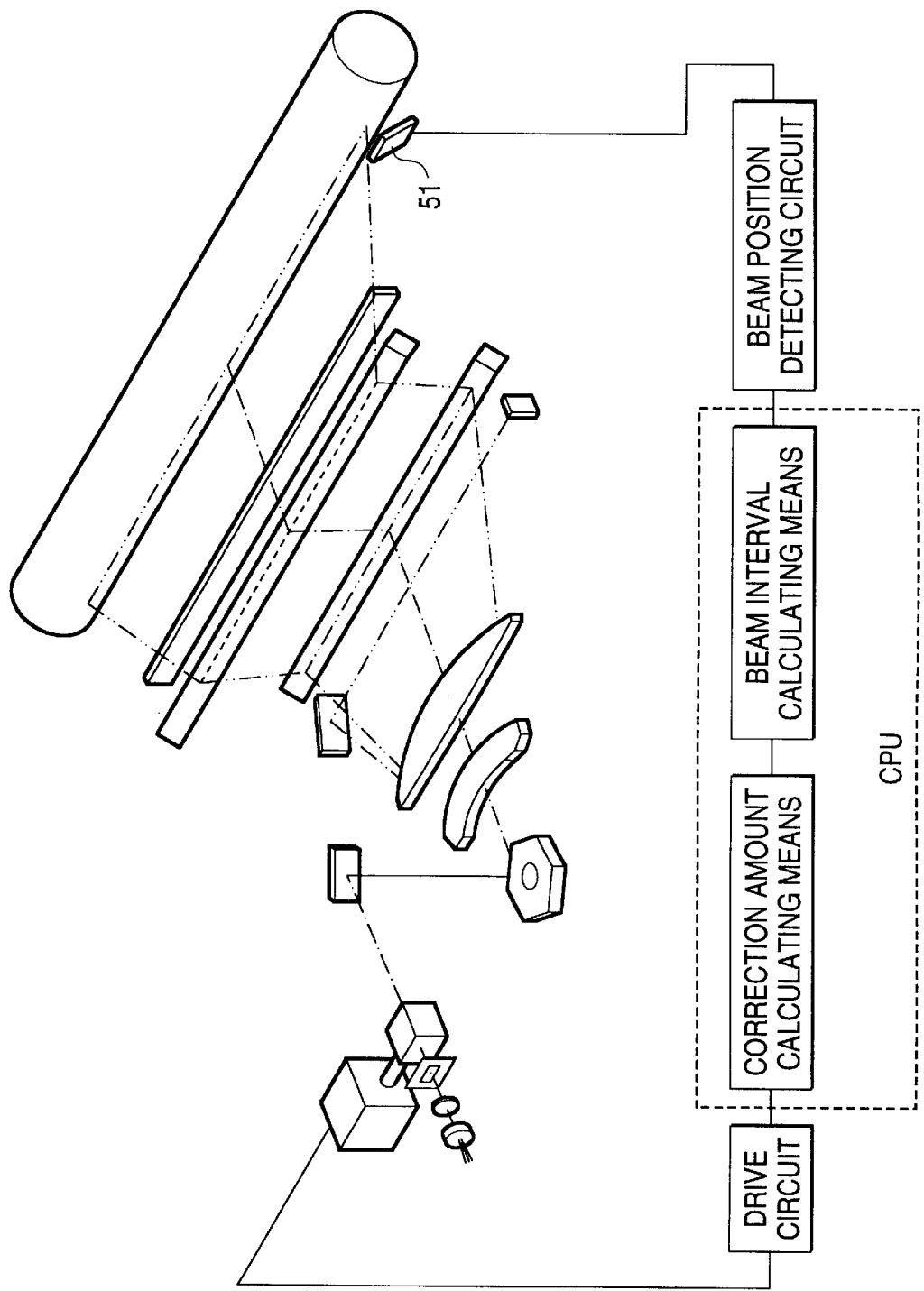
FIG. 10 is a structural diagram showing a multibeam laser recording apparatus according to an embodiment 3 of the present invention.

On the other hand, when the scanning line interval detecting means 20 and 40 are arranged at a plane equivalent to the surface of the photosensitive drum 17 as indicated in the first embodiment of FIG. 1 or the second embodiment of FIG. 8, deviation (shift) in the positional precision of the scanning line interval detecting means 20 and 40 would become a measuring error. As illustrated in FIG. 10, in the arrangement for monitoring the surface of the photosensitive drum 17, the positional precision of the detecting elements 51 and 52 is not important, but the measuring time can be reduced.

The distance between the scanning lines formed at the same time by the laser diode chips LD1 and LD2 may be obtained based on the time t1 corresponding to the interval between either the pattern 1 and the pattern 2, or the pattern 3 and the pattern 4. Also, the distance between the scanning lines may be obtained which are determined based on the rotation speed of the rotary polygon 12 and the rotation speed of the photosensitive drum 17 from the time t2 corresponding to the interval between either the pattern 1 and the pattern 3, or the pattern 2 and the pattern 4. A shift of the time t1 front a preselected value is caused by deviation of the focusing magnification caused by the optical system, whereas a shift of the time t2 from a preselected value is caused by deviation of the speeds in the sub-scanning direction. That is, the reasons of occurrences of these shifts are different from each other. The major reason for the speed shift along the sub-scanning direction is caused by the shift in the rotation speeds of the photosensitive drum 17 and the shift in the rotation speeds of the rotary polygon 12. However, the intervals between the main scanning lines are necessarily shifted in the output image due to any reasons, resulting in deterioration of the image quality. As a result, when the relative values of the time t1 and the time t2 are actually obtained, and either the rotation speed of the photosensitive drum 17, or the rotation speed of the rotary polygon 12 is varied which may cause the shift, the aspect ratio of the image would be changed. However, Of this aspect ratio change is small, then there is no problem in the image quality. However, when the aspect ratio is changed which cannot be neglected, the frequency of the image write signal is also varied, so that such an image whose aspect ratio is not varied can be provided.

Since other arrangements and effects of this embodiment 3 are similar to those of the preceding embodiments, no explanations thereof are made.

Figure 15A:
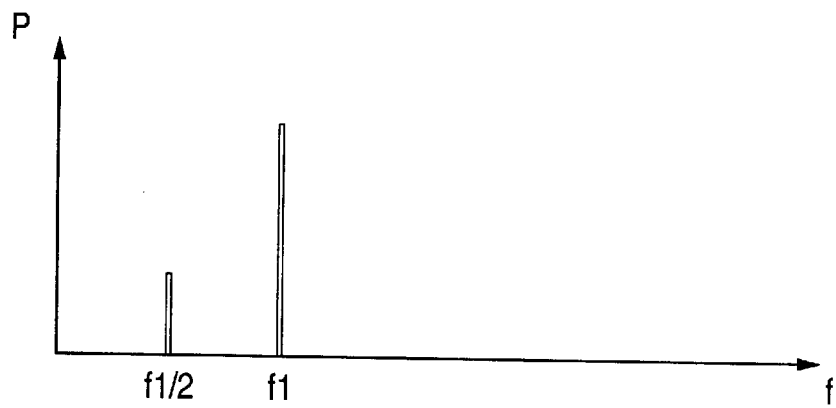
FIGS. 15A and 15B are graphs representing the outputs of the scanning line interval detecting means.
Figure 15B:
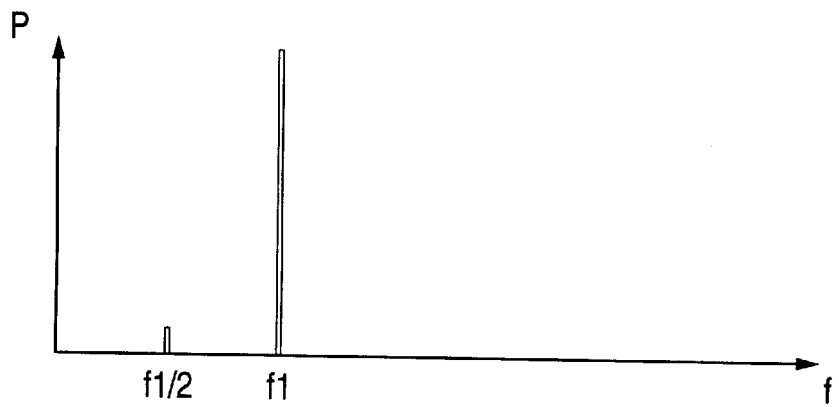
Figure 16:
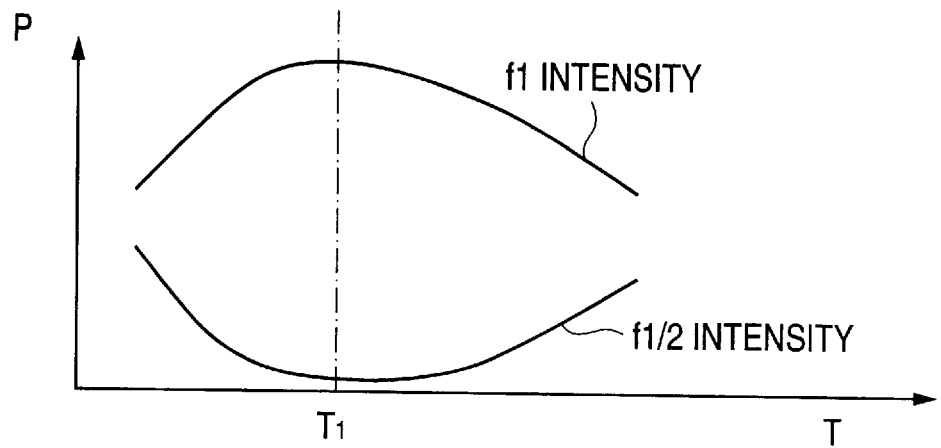
FIG. 16 is a graph showing the output of the scanning line interval detecting means.
Figure 17:
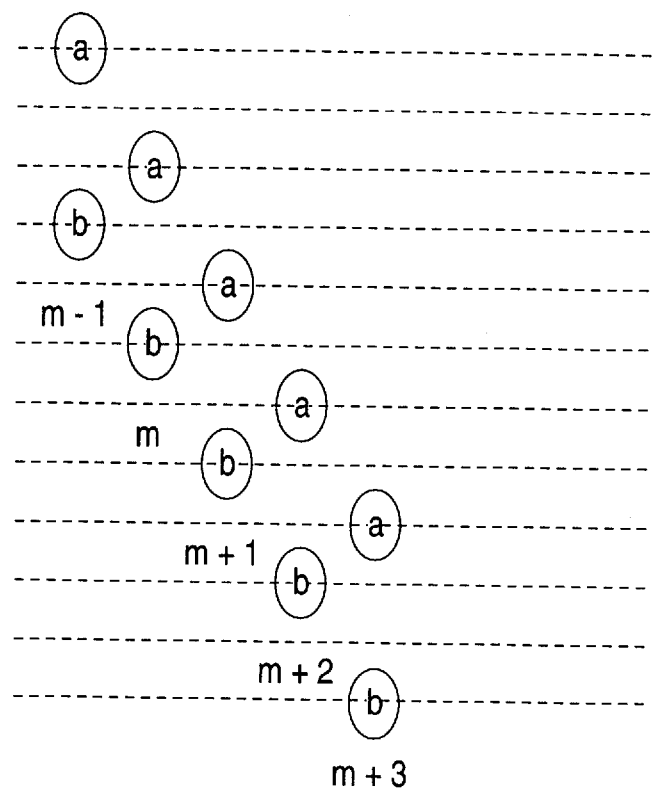
FIG. 17 is a structural diagram showing the interlace scanning operation of the conventional multibeam laser recording apparatus.
Figure 18:
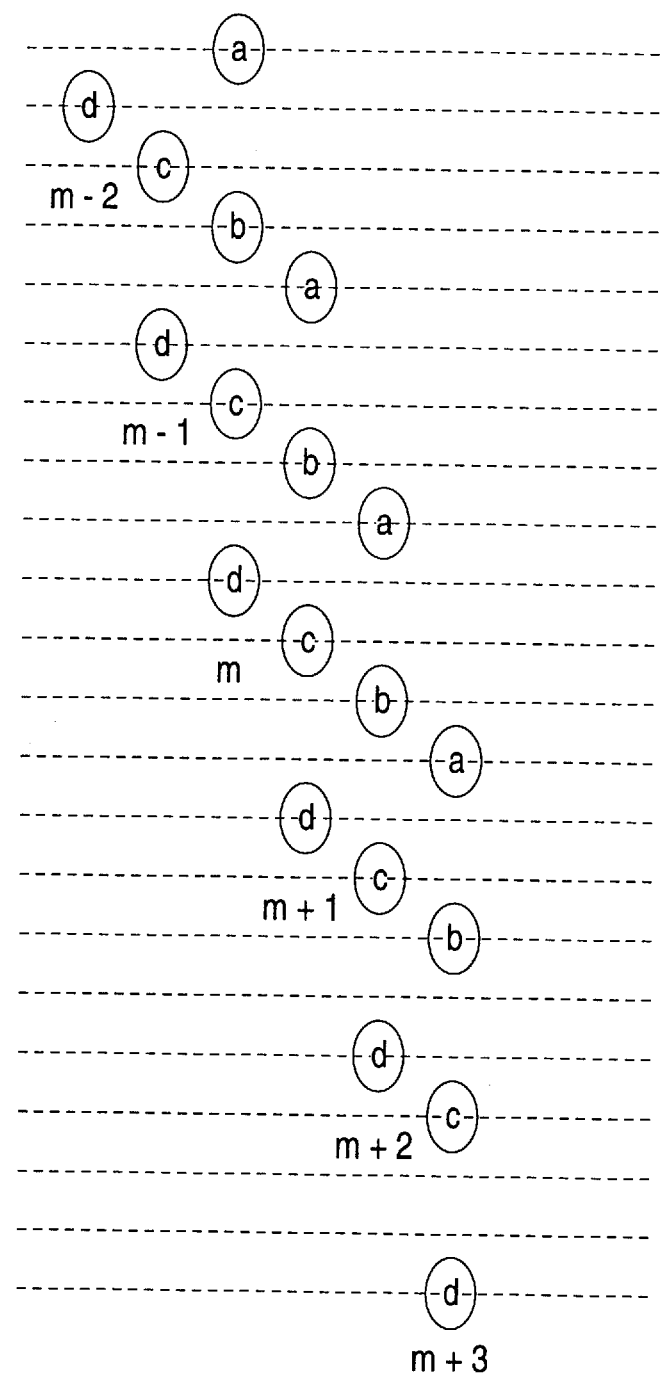
FIG. 18 is a structural diagram for indicating another interlace scanning operation of the conventional multibeam laser recording apparatus.
Figure 19A:
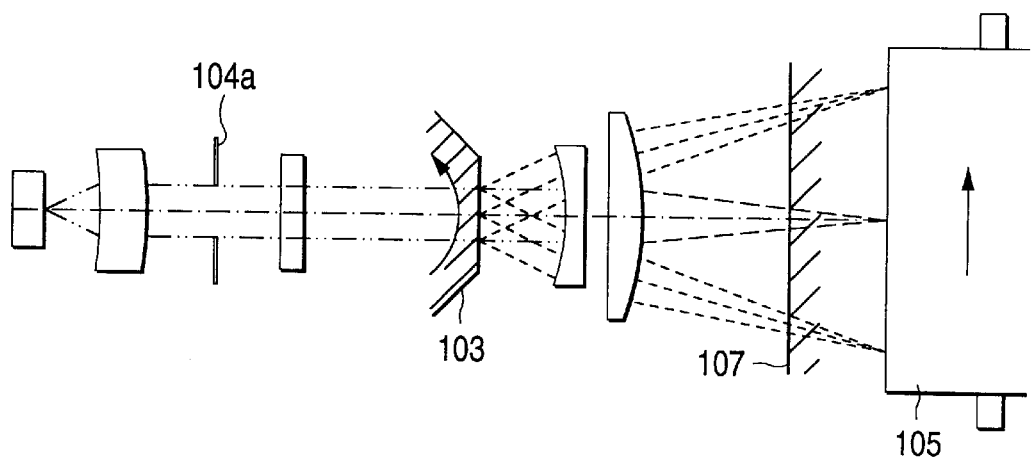
FIGS. 19A and 19B are a plan view/a side view showing the optical system of the conventional multibeam laser recording apparatus.
Figure 19B:
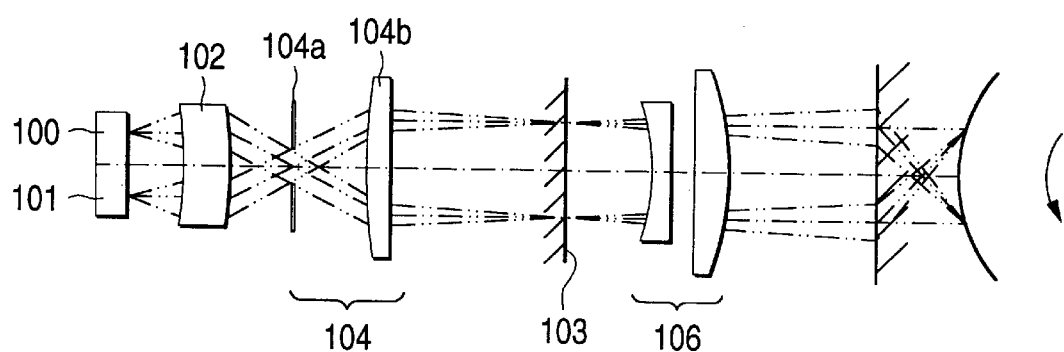
Figure 20A:
FIGS. 20A and 20B are structural diagrams showing the interlace scanning operation of the conventional multibeam laser recording apparatus.
Figure 20B:
Figure 21:
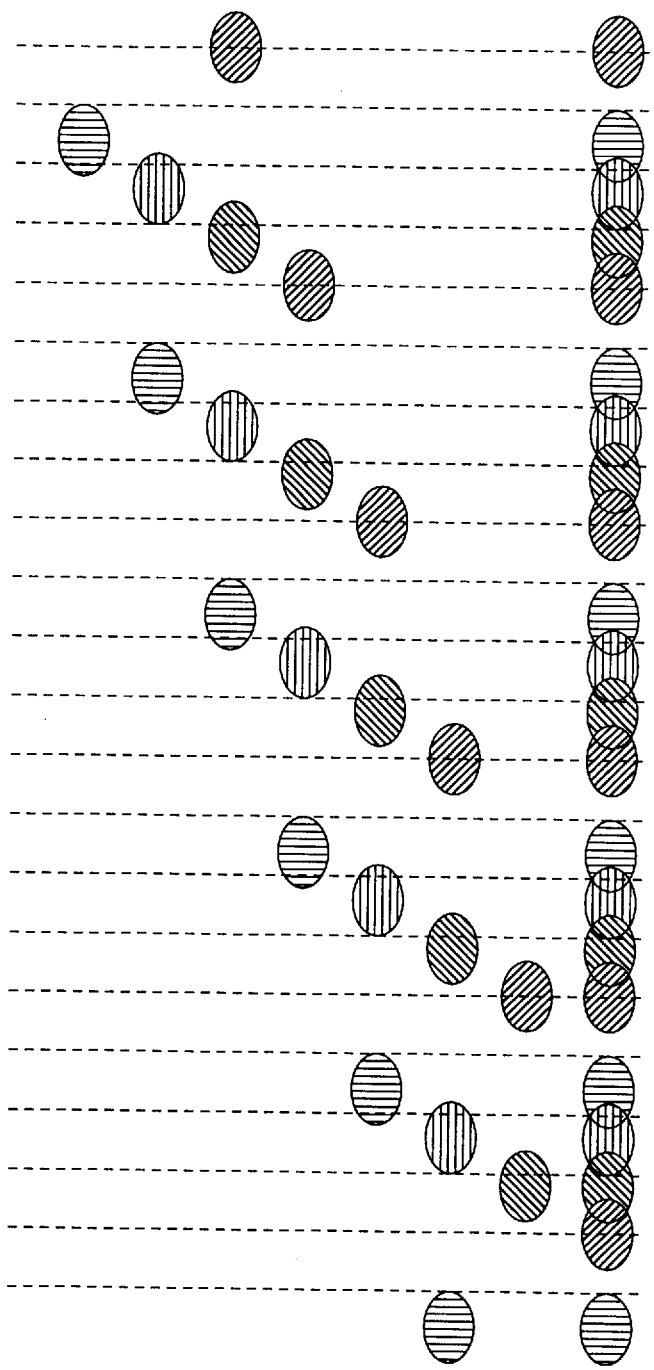
FIG. 21 is a structural diagram showing the interlace scanning operation of the conventional multibeam laser recording apparatus.
Figure 22:
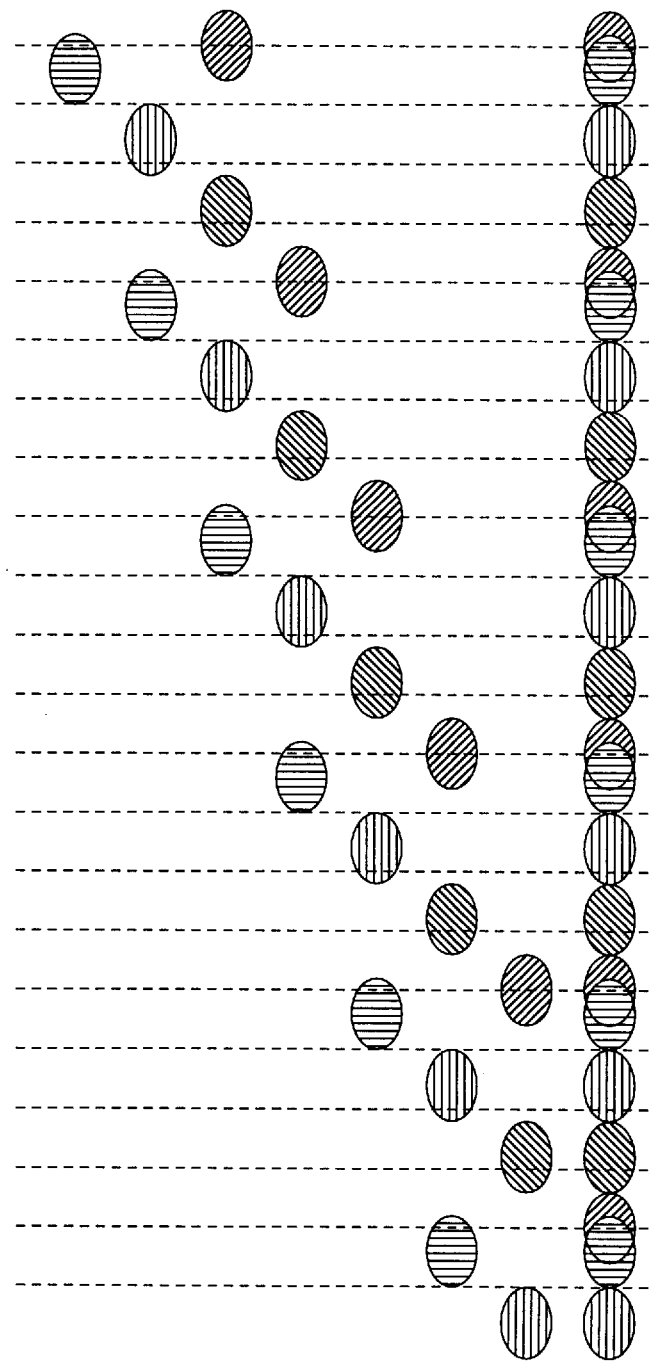
FIG. 22 is a structural diagram showing the interlace scanning operation of the conventional multibeam laser recording apparatus.

FIGS. 15A, 15B and 16 represent a fourth embodiment according to the present invention. The sap reference numerals shown in the preceding embodiments will be employed as those for denoting the same or similar elements of this embodiment. In this embodiment, it is so arranged to detect the ladder patterns of the third embodiment by using the detecting element of the third embodiment.

Figure 11B:
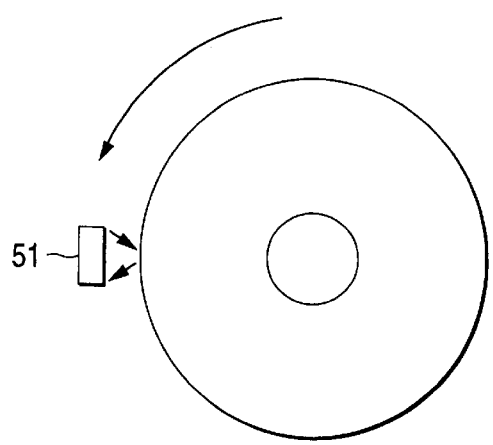
Figure 11C:
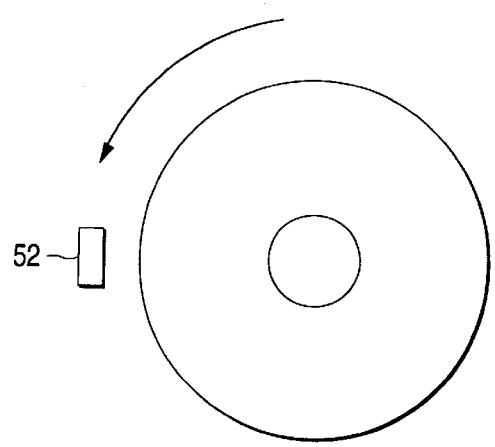

That is, when two laser beams L1 and L2 are employed, as shown in FIGS. 11A to 11C, the scanning lines are alternately formed by the laser diode chips LD1 and LD2, the patterns are constructed with having the equiinterval, and also the patterns are formed in such a manner that the combinations of the patterns formed by the laser diode chips LD1 and LD2 have a length longer than 10 sets of patterns. Then, the pattern 50 forme on the photosensitive drum 17 is detected by either the potential sensor 52, or the photoreflector 51. An output of the potential sensor 52 is A/D-converted and the A/D-converted output data are stored into a memory (not shown) in a time sequential manner. This data is FFT-processed to obtain a spectrum distribution of the repetition pattern 50. Assuming now, that a defined scanning line interval is T1 and a spatial frequency is f1, the resultant spectrum distribution of the repetition pattern 50 is obtained by that intensity of f1 becomes maximum. However, when there is a shift or deviation in the scanning line intervals, as indicated in FIGS. 15A and 15B, the intensity of the f1/2 spatial frequency becomes high, and the intensity of f1 is low. Furthermore, a change in the intensity of f1 and f1/2 is represented in FIG. 16, when the scanning line interval T of the repetition pattern 50 is indicated in the abscissa. When T=T1, the ratio thereof becomes maximum. As a consequence, such a multibeam laser recording apparatus having no shift in the scanning line intervals can be provided by correcting the magnification of the optical system and the speed along the sub-scanning direction in such a manner that the intensity ratio of f1 to f1/2 becomes maximum. As a consequence, the scanning line intervals of the laser beams can be controlled to become a proper value without detecting the scanning line intervals of the laser beams.

In this embodiment, the foregoing description has been made of the two laser beams. Even in case of employments of "n" sets of laser beams, a similar pattern is formed to be detected. When a shift is made in the scanning line intervals, the spatial frequency corresponding to the scanning line intervals is selected to be f1, and the spectrum of the spatial frequency of f1/n is detected, so that the detection is carried out by way that the intensity ratio of f1 to f1/n becomes maximum.

Since other arrangements arid effects of this embodiment are similar to those of the preceding embodiments, no explanations thereof are made.

Since the present invention has be made with the above-described arrangements and effects, the shifts or deviation in the scanning line intervals of the plural laser beams scanned on the image carrier such as the photosensitive drum are detected, and then the interval of the plural laser beams can be automatically corrected. As a result, such a multibeam laser recording apparatus capable of continuously obtaining the desired image quality can be provided.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multibeam laser recording apparatus, comprising:
a semiconductor laser array forming a light source;
a plurality of laser beams for simultaneously scanning a surface of an image carrier along a main scanning direction to form an image;
scanning line interval detecting means, located at a position distant from said image carrier, for detecting scanning line intervals of said plurality of laser beams scanned on the surface of said image carrier, wherein an optical path length between said light source and said scanning line interval detecting means is equivalent to an optical path length between said light source and said image carrier, said scanning line interval detecting means including two photosensing openings that are located perpendicular to each other and inclined with respect to a main scanning direction of the laser beams within a scanning plane; and control means for controlling the scanning line intervals of said plurality of laser beams scanned on the image carrier according to an output derived from said scanning line interval detecting means so that said scanning line intervals are maintained constant.

2. A multibeam laser recording apparatus as claimed in claim 1, wherein said control means compares outputs of the photosensing openings and controls scanning timings of the laser beams so that the detected intervals of said plural laser beams become equal to each other.

3. A multibeam laser recording apparatus as claimed in claim 1, further including a combined cylinder lens positioned along a sub-scanning direction, wherein said control means controls the scanning line intervals of the simultaneously scanned laser beams along said sub-scanning direction by controlling a magnification of said combined cylinder lens.

4. A multibeam laser recording apparatus as claimed in claim 1, wherein said control means controls the scanning line intervals of the simultaneously scanned laser beams along the sub-scanning direction by varying a speed of the image carrier.

5. A multibeam laser recording apparatus as claimed in claim 1, wherein said scanning line interval detecting means also includes an image sync signal detecting means.

6. A multibeam laser recording apparatus as claimed in claim 1, wherein said control means controls the scanning line intervals of the simultaneously scanned laser beams along a sub-scanning direction by changing a rotation speed of a rotary polygon mirror.

7. A multibeam laser recording apparatus as claimed in claim 6, wherein said control means controls pixel intervals of the simultaneously scanned laser beams along the main scanning direction by varying a frequency of an image writing signal.

8. A multibeam laser recording apparatus as claimed in claim 1, further comprising a mirror for reflecting a laser beam immediately before the laser beam reaches said image carrier;

wherein said scanning line interval detecting means is located so as to receive the beam reflected from said mirror.

9. A multibeam laser recording apparatus as claimed in claim 8, wherein said mirror comprises a plane mirror.

10. A multibeam laser recording apparatus, comprising:

a semiconductor laser array forming a light source;

a plurality of laser beams for simultaneously scanning a surface of an image carrier along a main scanning direction to form an image and a measuring pattern, said image carrier including a photosensitive member for forming an electrostatic latent image by irradiation of the laser beams, said measuring pattern extending along the main scanning direction and regularly repeating along a sub-scanning direction;

scanning line interval detecting means , located adjacent said image carrier, for detecting scanning line intervals of said plurality of laser beams scanned on the surface of said image carrier by sensing said measuring pattern;

control means for controlling the scanning line intervals of said plurality of laser beams scanned on the image carrier according to an output derived from said scanning line interval detecting means so that said scanning line intervals are maintained constant;

said scanning line interval detecting means detects a developed image obtained by developing said measuring pattern, and wherein said control means detects a change in said developed measuring pattern image by said scanning line interval detecting means.

11. A multibeam laser recording apparatus, comprising:

a semiconductor laser array forming a light source;

a plurality of laser beams for simultaneously scanning a surface of an image carrier along a main scanning direction to form an image and a measuring pattern, said image carrier including a photosensitive member for forming an electrostatic latent image by irradiation of the laser beams, said measuring pattern extending along the main scanning direction and regularly repeating along a sub-scanning direction;

scanning line interval detecting means, located adjacent said image carrier, for detecting scanning line intervals of said plurality of laser beams scanned on the surface of said image carrier by sensing said measuring pattern;

control means for controlling the scanning line intervals of said plurality of laser beams scanned on the image carrier according to an output derived from said scanning line interval detecting means so that said scanning line intervals are maintained constant;

said measuring pattern comprising a pattern having a period equal to the scanning interval of the simultaneously scanned laser beams along the sub-scanning direction, said control means monitoring a repetition spatial frequency distribution of the measuring pattern according to the output from said scanning line interval detecting means, and controlling the scanning line intervals so that when a number of laser beams is assumed as n, an intensity ratio of a frequency of the measuring pattern to a frequency equal to 1/n frequency of said measuring pattern becomes maximum.

12. A multibeam laser recording apparatus, comprising:

a semiconductor laser array forming a light source;

a plurality of laser beams for simultaneously scanning a surface of an image carrier along a main scanning direction to form an image and a measuring pattern, said image carrier including a photosensitive member for forming an electrostatic latent image by irradiation of the laser beams, said measuring pattern extending along the main scanning direction and regularly repeating along a sub-scanning direction;

scanning line interval detecting means, located adjacent said image carrier, for detecting scanning line intervals of said plurality of laser beams scanned on the surface of said image carrier by sensing said measuring pattern;

control means for controlling the scanning line intervals of said plurality of laser beams scanned on the image carrier according to an output derived from said scanning line interval detecting means so that said scanning line intervals are maintained constant.

13. A multibeam laser recording apparatus as claimed in claim 12, further including a combined cylinder lens positioned along the sub-scanning direction wherein said control means controls the scanning line intervals of the laser beams along the sub-scanning direction by controlling an interval of said combined cylinder lens to vary a magnification thereof along the sub-scanning direction.

14. A multibeam laser recording apparatus as claimed in claim 12, wherein said control means controls the scanning line intervals of the laser beams along the sub-scanning direction by changing a rotation speed of a rotary polygon mirror.

15. A multibeam laser recording apparatus as claimed in claim 12, wherein said control means controls the scanning line intervals of the laser beams along the sub-scanning direction by varying a speed of the image carrier.

16. A multibeam laser recording apparatus as claimed in claim 12, wherein said control means controls pixel intervals of the laser beams along the main scanning direction by varying a frequency of an image writing signal.

17. A multibeam laser recording apparatus as claimed in claim 12, wherein said scanning line interval detecting means also includes an image sync signal detecting means.

18. A multibeam laser recording apparatus as claimed in claim 12, wherein said scanning line interval detecting means includes a potential sensor for detecting a potential at the photosensitive member, said control means detecting a potential change in said exposed image by said scanning line interval detecting means.

* * * * *